United States Patent [19]

Erb et al.

[11] Patent Number: 4,980,003

[45] Date of Patent: Dec. 25, 1990

[54] METHOD FOR PRODUCING ZIGZAGGED PLASTIC STRAND AND FORMING INTO MULTIPLE-HOOK FASTENER MEDIA

[75] Inventors: George H. Erb, Cuttingsville; Susan E. Beard, Rutland, both of Vt.

[73] Assignee: Erblok Associates, Charlottesville, Va.

[21] Appl. No.: 156,900

[22] Filed: Feb. 17, 1988

[51] Int. Cl.⁵ .................... B23K 26/00; B29C 65/08; B32B 31/20

[52] U.S. Cl. .................... 156/73.2; 24/448; 24/449; 83/880; 83/917; 219/121.69; 219/121.72; 264/287; 264/296; 156/177; 156/211; 156/257; 156/272.8

[58] Field of Search .................... 156/73.1, 73.2, 177, 156/211, 257, 272–278; 219/121.67, 121.68, 121.69, 121.72; 264/287, 296; 428/100; 24/442, 448, 449, 450; 83/917, 875, 880

[56] References Cited

U.S. PATENT DOCUMENTS

| | | | |
|---|---|---|---|
| 2,102,392 | 12/1937 | Tea | 156/177 |
| 3,147,528 | 9/1964 | Erb | 24/204 |
| 3,196,490 | 7/1965 | Erb | 18/21 |
| 3,197,537 | 7/1965 | Hansen | 264/287 |
| 3,243,489 | 3/1966 | Porepp | 264/296 |
| 3,546,754 | 12/1970 | Erb | 24/204 |
| 3,550,223 | 12/1970 | Erb | 24/204 |
| 3,550,837 | 12/1970 | Erb | 229/45 |
| 3,562,044 | 2/1971 | Erb | 156/155 |
| 3,562,770 | 2/1971 | Erb | 24/204 |
| 3,586,060 | 6/1971 | Erb | 139/46 |
| 3,594,863 | 7/1971 | Erb | 18/21 |
| 3,594,865 | 7/1971 | Erb | 18/5 |
| 3,595,059 | 7/1971 | Erb | 72/362 |
| 3,629,032 | 12/1971 | Erb | 156/196 |
| 3,665,584 | 5/1972 | Erb | 29/410 |
| 3,695,976 | 10/1972 | Erb | 156/435 |
| 3,708,382 | 1/1973 | Erb | 161/48 |
| 3,715,415 | 2/1973 | Erb | 204/25 |
| 3,732,604 | 5/1973 | Erb | 28/76 P |
| 3,735,468 | 5/1973 | Erb | 29/207 |
| 3,781,398 | 12/1973 | Erb | 264/146 |
| 3,801,245 | 4/1974 | Erb | 425/174.4 |
| 4,290,832 | 9/1981 | Kalleberg | 24/448 |
| 4,307,493 | 12/1981 | Ochiai | 24/450 |
| 4,615,084 | 10/1986 | Erb | 24/442 |
| 4,710,605 | 12/1987 | Presby | 219/121.69 |

*Primary Examiner*—Michael Wityshyn
*Attorney, Agent, or Firm*—Parmalee, Bollinger & Bramblett

[57] ABSTRACT

U.S. Pat. No. 4,615,084 disclosed and claimed a method for making multiple-hook fasteners and the resulting multiple-hooks. A strand of stiffly flexible bendable settable polymeric plastic material is zig-zagged back and forth cross a centerline, with sharply doubled-back bends at each zig and zag. The present method enables the doubled-back bends in such a plastic monofilament to be shaped sharply by initially causing the strand to be nicked or scooped at predetermined intervals to predetermined depth and length by at least one laser beam. The pre-nicked strand is used by feeding it endwise at a predetermined feed rate into a zigzag station wherein it is confined and guided by side walls diverging in the downstream direction and appropriately configured to shape the pre-nicked strand into the desired zigzag configuration. In the zigzag station, its leading, i.e. downstream, portions are slowed down relative to the predetermined feed rate of its incoming, i.e. upstream, portions for causing it to become sharply bent back and forth at the pre-formed nicks thereby forming a sharply bent zigzag pattern ready for forming into multiple hook fastener media. The zigzagged strand of thermoplastic material is formed into hooks and the hooks are set by passing through a heated shaping zone and a cooled setting zone. The resulting formed hooks are in rows which can be bonded to a substrate in a wide variation of pitch settings and lateral spacings.

38 Claims, 27 Drawing Sheets $d \cong 50\%$ OF D

AREA A = 50% OF ORIGINAL $d \cong 62\%$ OF D

AREA A = 35% OF ORIGINAL

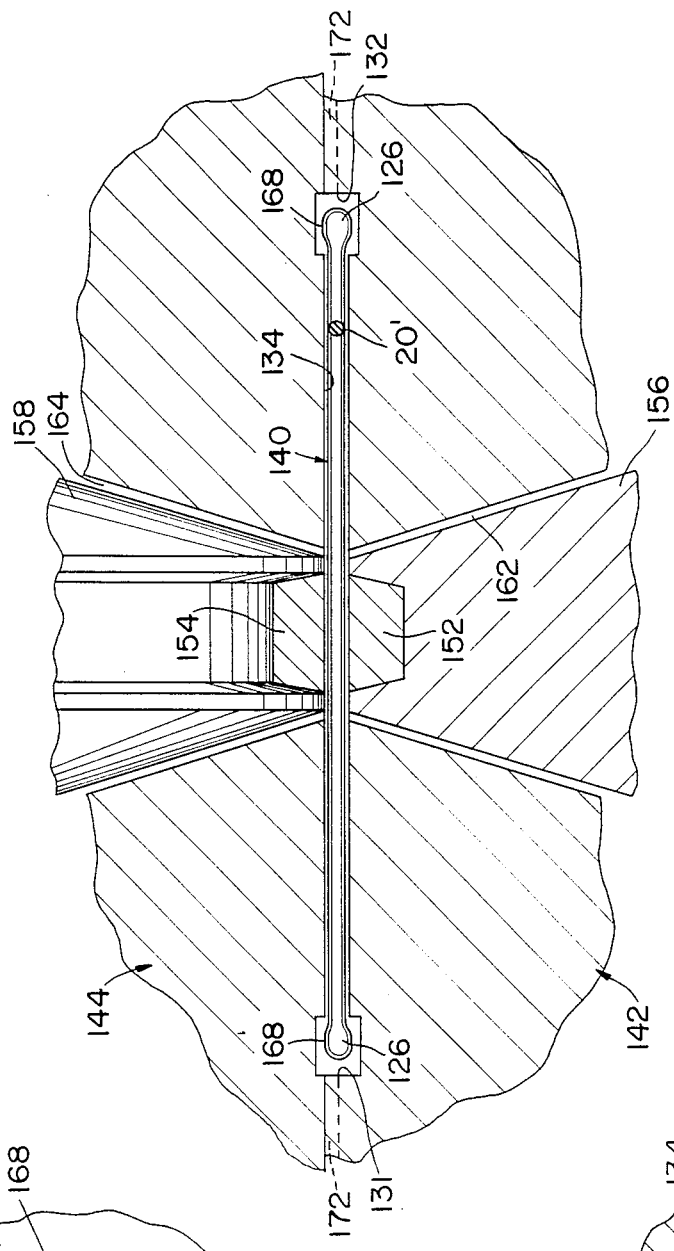
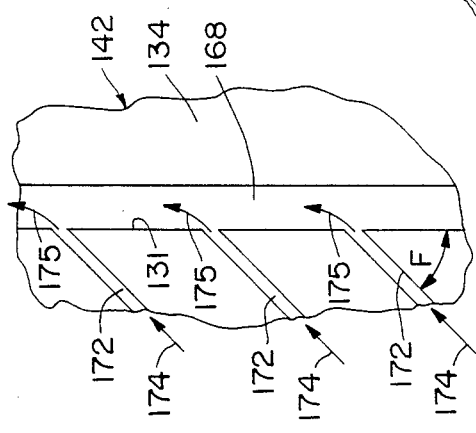
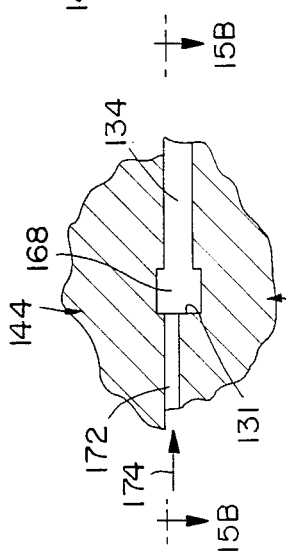
FIG.15
FIG.15B
FIG.15A

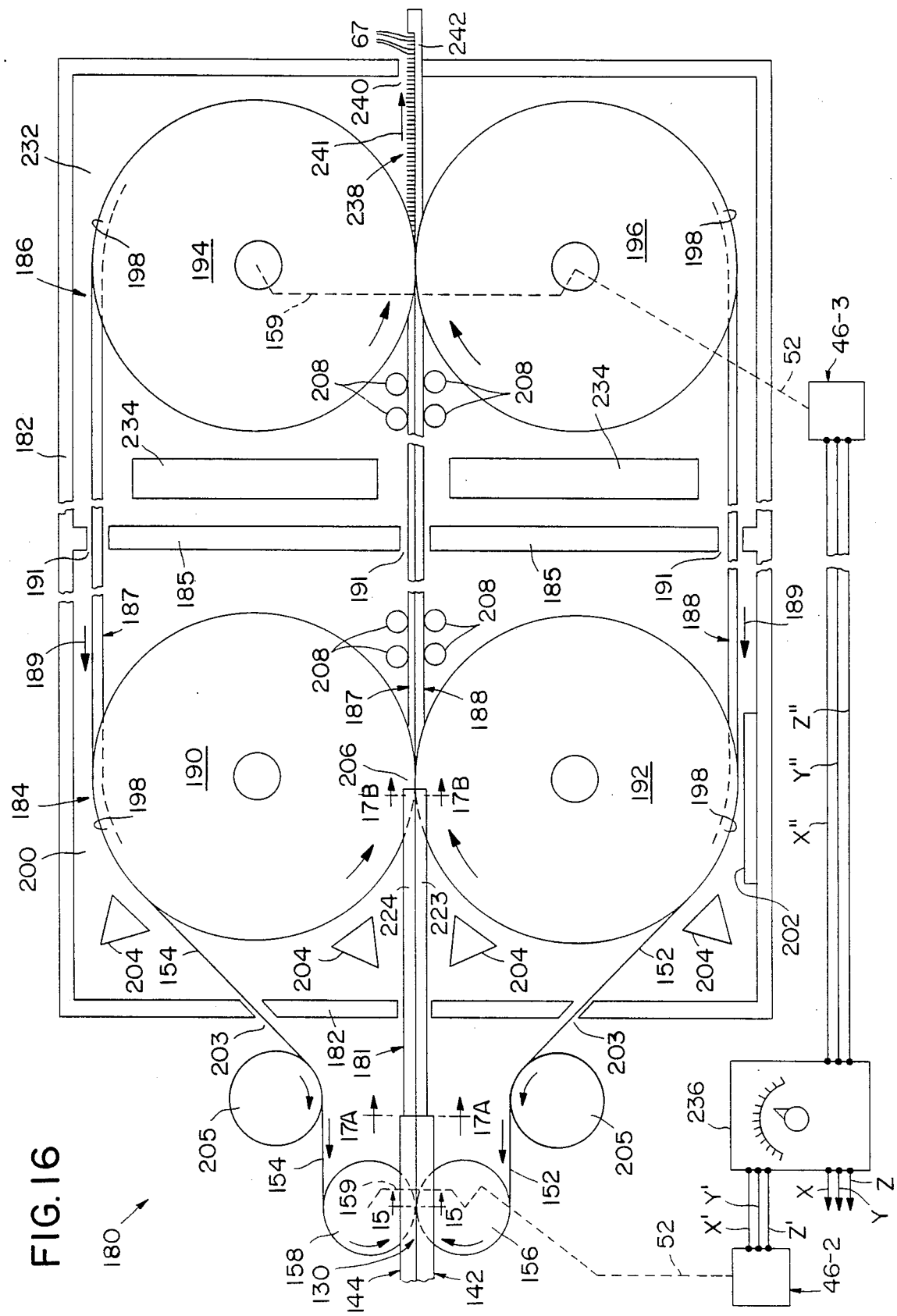

12 PITCH

16 PITCH

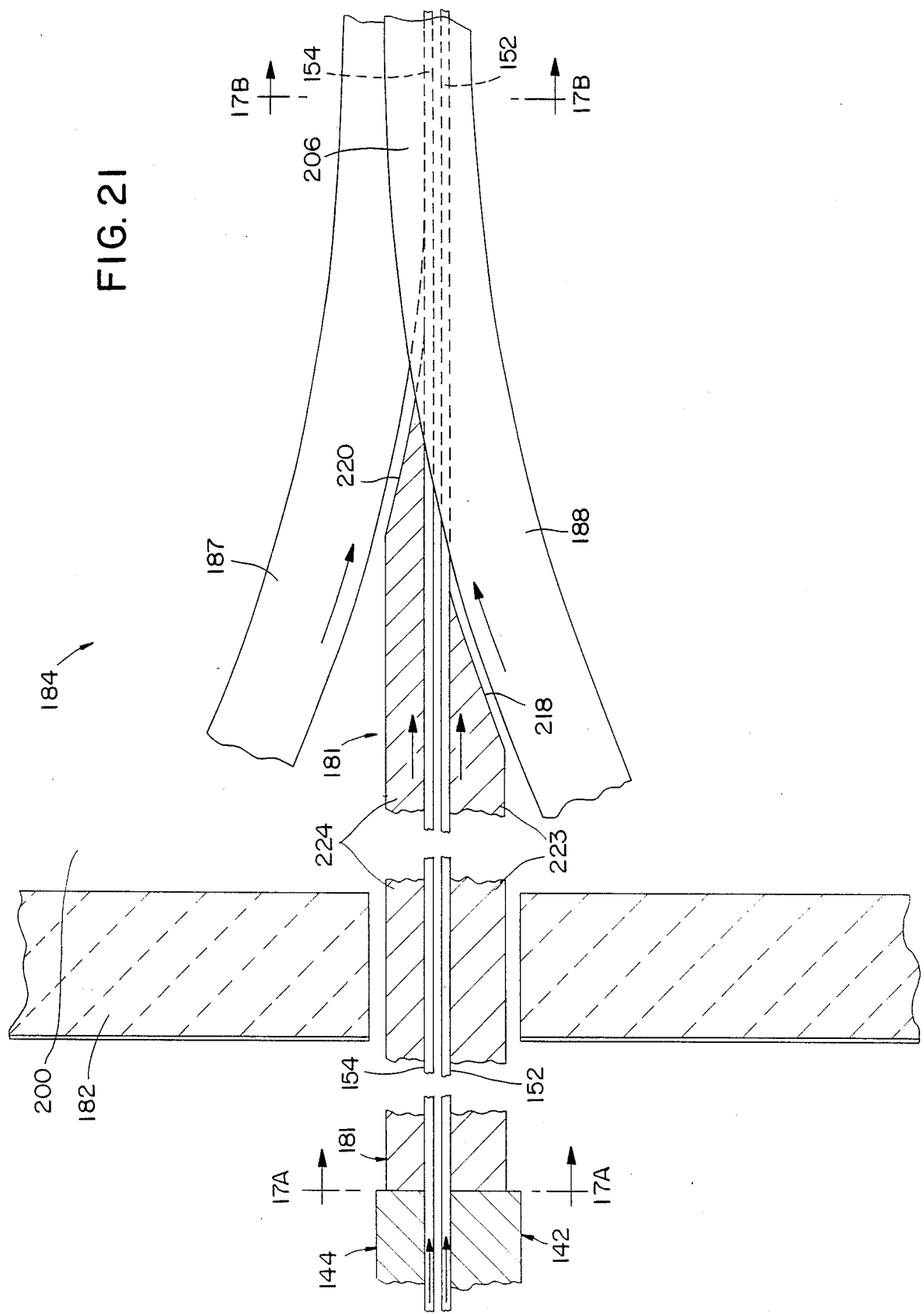

METHOD FOR PRODUCING ZIGZAGGED PLASTIC STRAND AND FORMING INTO MULTIPLE-HOOK FASTENER MEDIA

FIELD OF THE INVENTION

This invention is in the field of hook and loop fasteners, and more specifically the invention relates to a method, system and apparatus for making the hook-fastener medium for providing hook-like gripping engagement with an opposed area containing multiple accessible loops or fibers forming multiple accessible apertures. The hook-fastener medium contains multiple small hooks protruding from one face. This hook-fastener medium is brought into contact with a second fastener area containing multiple loops or multiple fibers forming loop-like apertures, herein called the "loop medium". The hooks become engaged in hook-like fashion with the loops or loop-like apertures of the loop medium of attaching the hook-fastener medium to the mating loop medium. Subsequently, if desired, the hook-fastener medium can most easily be disengaged from the loop medium by a "peeling" action. The mated hook and loop fastener media are intended to resist separation by tension force pulling directly perpendicular to the mated areas and to resist separation by shearing force acting parallel to the mated areas. Such hook and loop fasteners are usually intended to be capable of being separated and refastened together at least several times during their lifetime. Advantageously, the method, system and apparatus embodying the invention also enable the making of a "bi-functional" medium containing both hooks and loops. Thus, a user has the choice of various combinations of matable fastener media, because this bi-functional medium can be mated with another portion of the same bi-functional medium or can be mated with a loop medium or with a hook medium.

BACKGROUND

The background for the present invention is set forth in U.S. Pat. No. 4,615,084 which issued on Oct. 7, 1986, and that disclosure is incorporated herein by reference.

SUMMARY OF THE DISCLOSURE

Advantageously, the method, system and apparatus of the present invention enable the doubled-back bends in such a strand to be shaped sharply by initially causing the strand to be nicked or scooped at relatively high speed at predetermined uniformly spaced intervals to a predetermined depth and length by at least one laser beam. The pre-nicked strand is then used by feeding it endwise at a predetermined feed rate into a zigzag station wherein it is confined and guided by sidewalls diverging in the downstream direction. In order to cause the pre-nicked strand to be shaped into the desired zigzag configuration, its leading, i.e. downstream, portions are slowed down relative to the predetermined feed rate of its incoming, i.e. upstream, portions for causing it to become sharply bent back and forth at the pre-formed nicked regions thereby forming the desired sharply bent zigzag pattern ready for forming into multiple hook fastener media.

In accordance with the present invention in one of its aspects, there is provided the method of forming a strand of bendable, settable material having a diameter "D" into a zigzag configured strand having sharply shaped doubled-back bends suitable for forming said zigzag configured strand into a multiple-hook fastener comprising feeding the strand endwise along a first path, nicking said strand at positions uniformly spaced along its length as it is travelling along said first path for producing scoop-nicks in said strand having a predetermined depth and length. The cross-sectional area "A" of the strand remaining in each scoop-nick region is adapted to provide a hinge relative to the original cross-sectional area of the strand, and the nicks extend longitudinally along the length of the strand for a sufficient nick length "N" for enabling the hinge to be bent in sharply double-back bends. Said scoop-nicks are spaced uniformly along said strand by a distance "L" from the center of one nick to the center of the next successive nick. The resultant scoop-nicked strand is fed endwise in a downstream direction along a second path at a first predetermined downstream feed rate; the travelling nicked strand is confined between floor and ceiling guide surfaces spaced apart slightly more than the diameter "D" of said strand for allowing the strand to move easily downstream between said floor and ceiling surfaces as the strand enters a zigzag station. The travelling nicked strand is also confined between first and second spaced opposed guide sidewalls extending between said floor and ceiling surfaces in said zigzag station. Said guide sidewalls initially are spaced apart slightly more than said diameter "D" for defining an inlet to said zigzag station, and said guide sidewalls become more widely spaced laterally and are appropriately configured for causing the prenicked strand to become zigzagged. The zigzag station has an outlet passageway and said guide sidewalls in said outlet passageway are laterally spaced slightly greater than "L". In the inlet passageway, the nicked strand is fed downstream at the first predetermined downstream feed rate and encounters a barrier moving at a second predetermined downstream rate slower than said first predetermined downstream feed rate, causing the nicked strand to bend in the zigzag station at the nicked (hinge) regions into a zigzag configured strand having sharply doubled-back bends. The zigzag configured strand is then formed into multiple hooks having tips wherein each of the respective tips of the hook is a respective one of said sharply doubled-back bends.

BRIEF DESCRIPTION OF THE DRAWINGS

The foregoing and other aspects, objects, features and advantages of the invention will become more fully understood from the following description of preferred embodiments of the invention, as illustrated in the accompanying drawings, in which like reference characters refer to like parts throughout the different views. The drawings are not to scale, emphasis being placed upon clarity of illustration of the principles of the invention.

(FIG. 8 is shown rotated 90° relative to the section line 8—8 in FIG. 7.)

FIG. 15 is an enlarged cross-sectional view taken along the line 15—15 in FIG. 14.

FIGS. 15A and 15B show heating using hot air passages.

FIG. 16 is a schematic diagram of the hook forming method and system embodying this invention, including the hook shaping and setting zones.

FIG. 17A also is a section on 17A—17A in FIG. 25.

FIG. 21 is an enlarged elevational view of portions of the hook shaping zone.

DETAILED DESCRIPTION OF PREFERRED EMBODIMENTS

Figure 1:
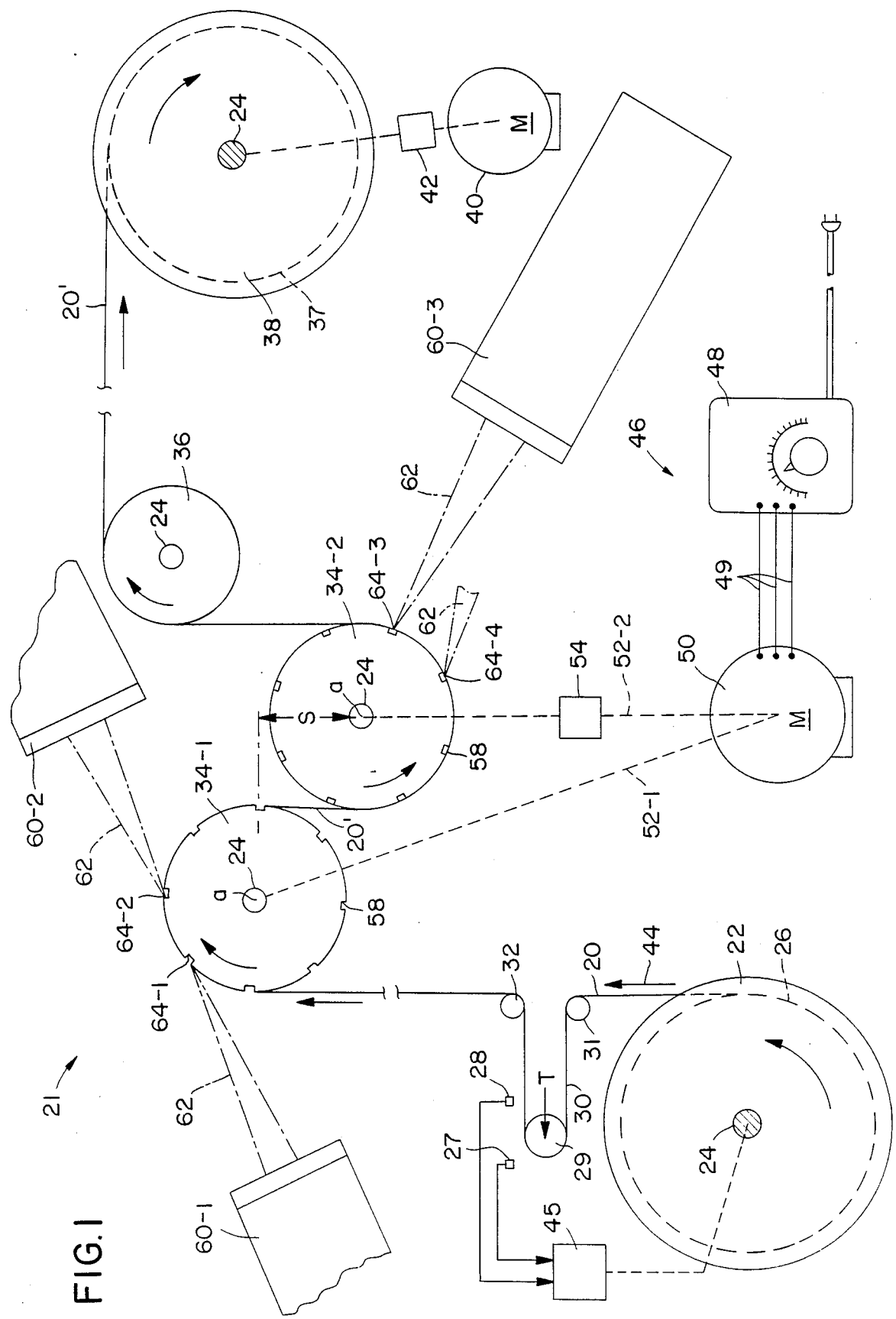
FIG. 1 illustrates the method, system and apparatus for scoop-nicking a stiffly flexible strand of bendable and settable polymeric plastic material by one or more laser beams, while the strand is being carried by one or more nicking wheels.

In FIG. 1 is shown a system and apparatus generally indicated at 21 for performing laser nicking of a strand 20 in accordance with certain aspects of the method of the present invention. This strand 20 is fed from a flanged supply reel 22 rotatably mounted by a support shaft 24. This supply reel is rotated by drive means 45, controlled by sensors 27 and 28, for example photocells, which sense the upper and lower positions of a dancer pulley 29 in a loop 30 of the strand 20 festooned over idler pulleys 31 and 32. The dancer pulley 29 is subject to a thrust "T" provided, for example by its weight or by air pressure. Thus, the controlled drive means 45 compensates for variations in the speed and tension of the strand 20 as it feeds from the winding 26, as indicated by the arrow 44.

The strand 20 is a monofilament of polymeric plastic material which is stiffly flexible at room temperature but which becomes shape-settable by heating and shaping at suitably elevated temperature and then cooling. For example, this polymeric plastic in the monofilament strand 20 may advantageously be nylon polyamide.

The strand 20 is driven in a groove around the perimeter of each of first and second identical laser nicking wheels 34-1 and 34-2, which are mounted on perpendicular offset axes "a". (These nicking wheels are shown with parallel axes "a" for ease of illustration.) The strand runs for at least 90° around each of these laser nicking wheels and then passes over a grooved idler pulley 36, and the resultant scoop-nicked strand 20' is wound in a winding 37 on a flanged take-up reel 38, driven by a motor 40 through a slipping clutch 42 for always maintaining a slight tension on the nicked strand 20' as it is being wound onto the take-up reel. As an alternative, rather than using a slipping clutch 42, the drive means 40 may be controlled by a dancer loop sensing system similar to that shown for the incoming drive means 45.

A controllable speed drive generally indicated at 46 for the laser nicking wheels 34-1 and 34-2 includes a manually adjustable speed controller 48 connected by electrical leads 49 for energizing a controllable speed motor 50 coupled through a mechanical transmission 52-1 to the shaft 24 of the first laser nicking wheel 34-1 and also coupled through another mechanical transmission 52-2 to the shaft 24 of the second laser nicking wheel 34-2. This second transmission 52-2 includes a rotational direction reversing gear mechanism 54 for causing the second wheel 34-2 to turn in the opposite direction from the first wheel 34-1. The speed controller 48 may provide controllable voltage D.C. power through the leads 49 to a controllable speed D.C. motor 50 or may provide controllable frequency A.C. power through the leads 49 to a controllable speed A.C. motor. In an alternative arrangement of the controllable speed drive 46, the motor 50 is directly energized by A.C. power, and the transmissions 52-1 and 52-2 comprise a variable speed mechanical transmission, for example such as variable ratio V-belt drives whose output is connected through timing belts to the shaft of the wheel 34-1 and to the reversing unit 54.

Figure 2:
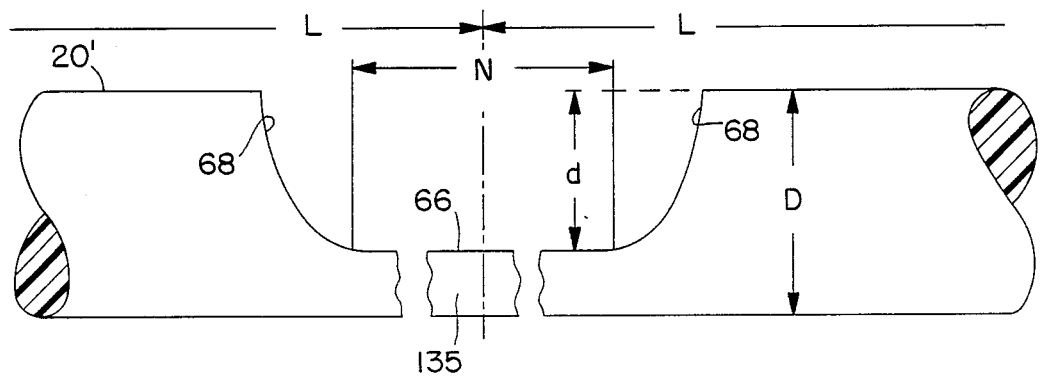
FIG. 2 is a greatly enlarged elevational view of a scoop-nicked region of such a strand.
Figure 3:
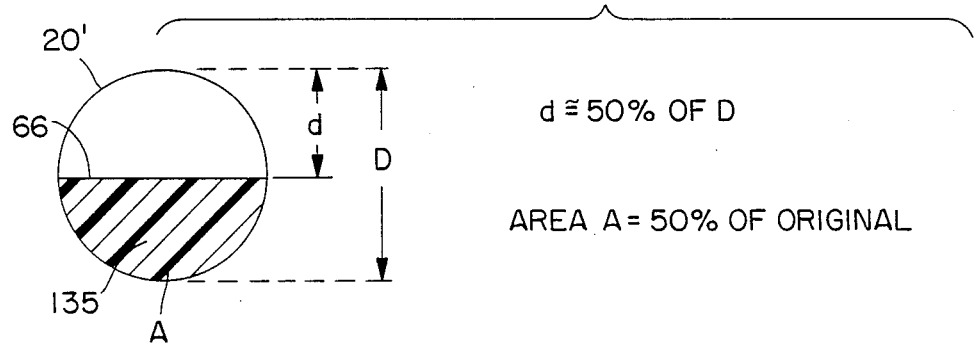
FIGS. 3 and 4 are cross-sectional views for showing relationships of the cross-sectional area of the nicked region compared with the original cross-sectional area of the strand.
Figure 4:
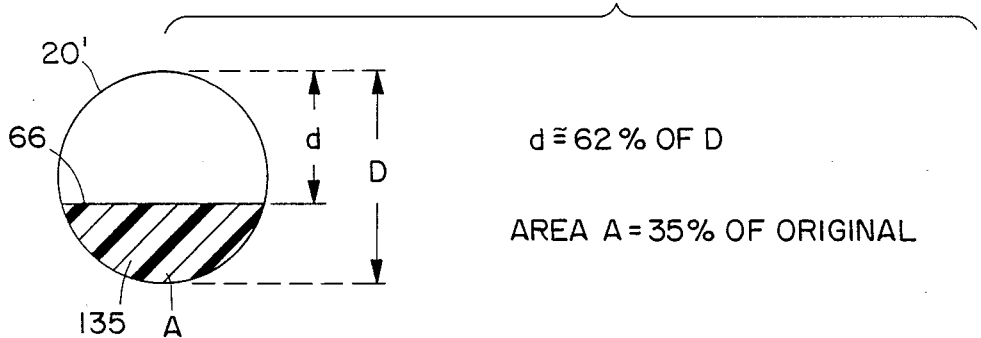
Figure 5:
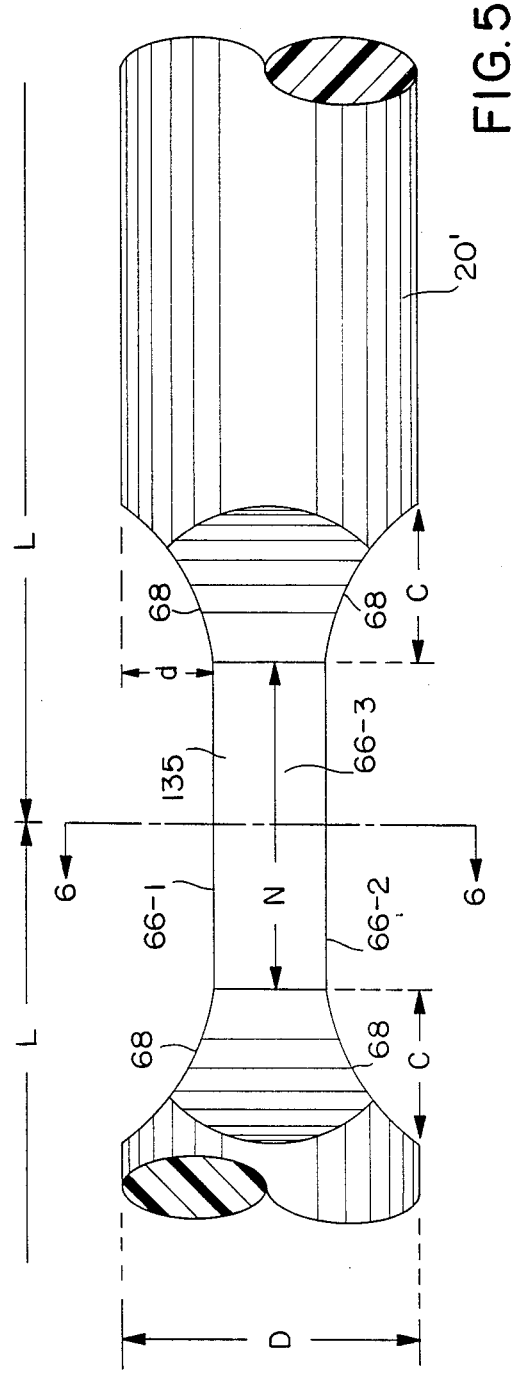
FIG. 5 is a greatly enlarged elevational view of another embodiment of a scoop-nicked region of such a strand.
Figure 6:
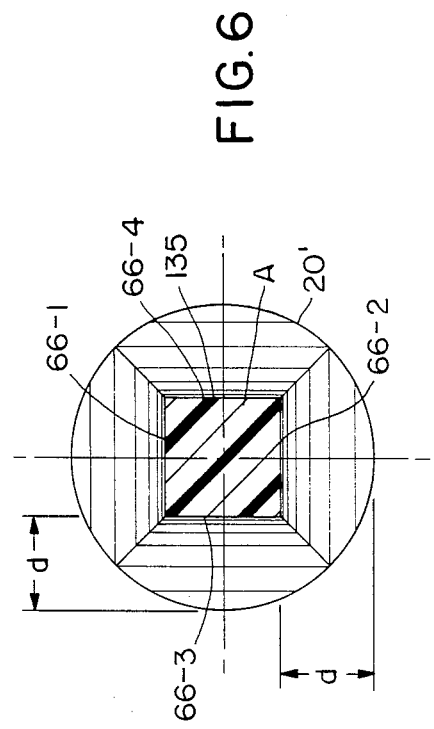
FIG. 6 is a cross-sectional view taken along the line 6—6 in FIG. 5.

In order to scoop-nick the strand 20 for forming the nicked strand 20', as shown in FIGS. 2, 3 and 4, or alternatively as shown in FIGS. 5 and 6, the perimeters of the laser nicking wheels 34-1 and 34-2 include aperture notches 58, as will be explained in detail in connection with FIGS. 7, 8 and 8A. One or more laser units 60-1, 60-2, 60-3 (there may be a fourth laser unit, not shown) have their respective laser beams 62 focused on a predetermined portion or portions of the strand 20 at a predetermined location or locations on the perimeter of one or both of the laser nicking wheels 34-1 and 34-2. Although not so illustrated in FIG. 1, the laser beam or beams 62 are actually aimed generally parallel to the respective wheel axes "a". (For convenience of illustration, the various laser units 60 and their beams 62 are not shown in their true three-dimensional relationship to the respective nicking wheels.)

In scoop-nicking the nylon strand 20, a $CO_2$ continuously energized laser unit has been used with success.

In order to produce the four-sided nicking configuration shown enlarged in FIGS. 5 and 6, the beam 62 from the first and second laser units 60-1 and 60-2 are aimed through different notches 58 at the strand 20 from opposite sides as it is travelling with the first laser nicking wheel (it being understood that two laser beams should not be aimed directly at each other from opposite directions). These beams 62 obtain access to the strand 20 as the successive aperture notches 58 sweep through the focus 64 of the respective laser energy beam 62. Moreover, the focus 64-1 of the first laser unit 60-1 is aimed at the underside (or upperside) of the strand 20 in one of the notches 58, while the focus 64-2 of the second laser unit 60-2 is aimed at the respective upperside (or underside) of the strand in another of the notches 58. Thus, pairs of the opposed scoop-nicks 66-1 and 66-2 (FIGS. 5 and 6) are formed in the nicked strand 20'.

The other pairs of opposed scoop-nicks 66-3 and 66-4 are formed as the nicked strand is running around the second nicking wheel 34-2. As mentioned previously, it is to be understood that the axis "a" of the shaft 24 for this second nicking wheel 34-2 actually is oriented at right angles to the axis "a" of the shaft 24 for the first wheel 34-1, and these axes "a" are offset by a slight distance "S" for causing the opposed nicks 66-1 and 66-2 to become registered with the aperture notches 58 in the second wheel 34-2 as the nicked strand 20' is travelling around the perimeter of this second wheel. By virtue of the axis of the second laser nicking wheel 34-2 thus being oriented at right angles to the first axis, each second pair of scoop-nicks 66-3 and 66-4 are oriented at 90° to the first pair 66-1 and 66-2. The focus 64-3 of the third laser unit 60-3 FIG. 1) is aimed at the underside (or upperside) of the nicked strand 20' in one of the aperture notches 58 of the second wheel 34-2, while the focus 64-4 of a fourth laser unit (not shown) is aimed in another of the notches 58 from the opposite side of this second wheel at the respective upperside (or underside) of the nicked strand 20'. Thus, the other two opposed scoop-nicks 66-3 and 66-4 are formed being oriented at 90° around the axis of the nicked strand 20' relative to the first pair of scoop-nicks 66-1 and 66-2.

Figure 18:
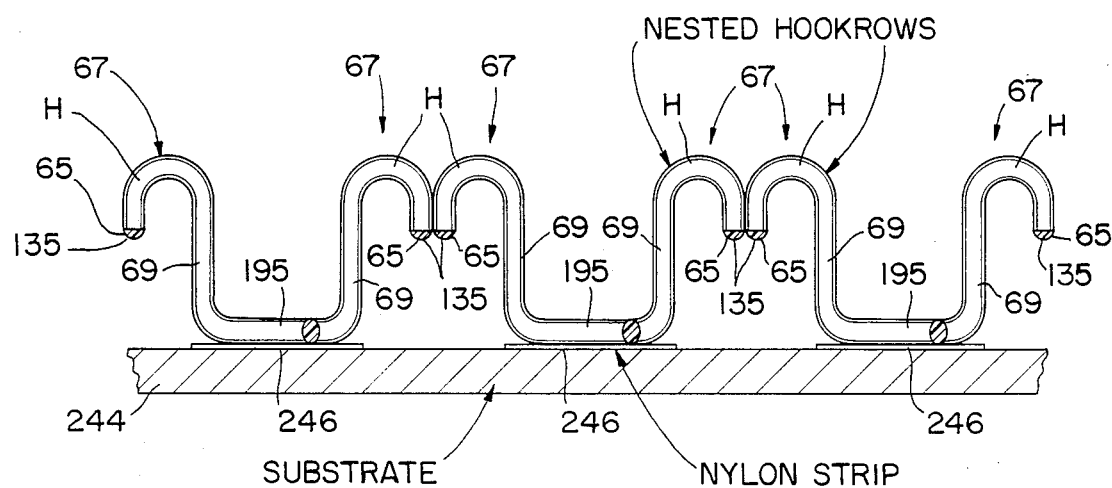
FIG. 18 is an enlarged elevational view of a plurality of hooks produced by using the present invention and shown attached to a substrate.

In FIGS. 5 and 6, the depth "d" of these four scoop-nicks 66 is in the range for providing easily bendable hinges 135 while strongly interconnecting the strand sections 137 (FIG. 12) between the scoop nicks 66. For example, the depth "d" of these four scoop nicks in FIGS. 5 and 6 is in the range from about 0.15D to about 0.26D for causing the remaining area "A" to be in the range from about 60% to about 30% of the original cross-sectional area $0.25 \pi D^2$ (i.e. $0.79D^2$) of the circular strand 20 for providing the desired sharply doubled-back bends 126 (FIGS. 12D and 12E) at the tips 65 (FIG. 18) of the hooks 67 while retaining a desired amount of strength for interconnecting at each tip 65 the two legs 69 (only one of these dual legs 69 is seen in FIG. 18) forming the shanks of each hook. In FIG. 5, these scoop-nicks 66 extend along the length of the nicked strand 20' for a distance "N" greater than about 2.3D for providing the desired flexibility of the hinge regions 135 for achieving sharply doubled-back bends 126, as seen in FIGS. 12D and 12E. The curved shoulder area 68 in FIG. 5 at each end of each scoop-nick 66 has an axial length "C" equal to about 0.5D. The length "N" of these scoops is sufficiently long for keeping the shoulders 68 from bumping against each other in the sharply doubled-back bends 126 (FIGS. 12D and 12E). In other words, the strand segments 137 are intended to be able to lie side-by-side in parallel relationship, as shown in FIG. 12E at 140.

Similarly in FIG. 2, the desire is to obtain a flexible but strong hinge 135. Thus the length "N" of the single scoop-nick 66 is sufficiently long, for example more than about 2.3D, so that the shoulders 68 at either end of the scoop-nick 66 avoid bumping against each other for enabling the hinges 135 to be bent into a sharply doubled-back shape for allowing the strand segments 137 to lie side-by-side in parallel relationship, as shown in FIG. 12E at 140. The area "A" of material remaining in the hinge 135 is in the range from about 60% to about 30% of the original cross-sectional area of the strand. The depth "d" of the scoop-nick 66 is preferably in the range from about 0.5D to about 0.65D for a longitudinally oriented nylon monofilament.

Figure 7:
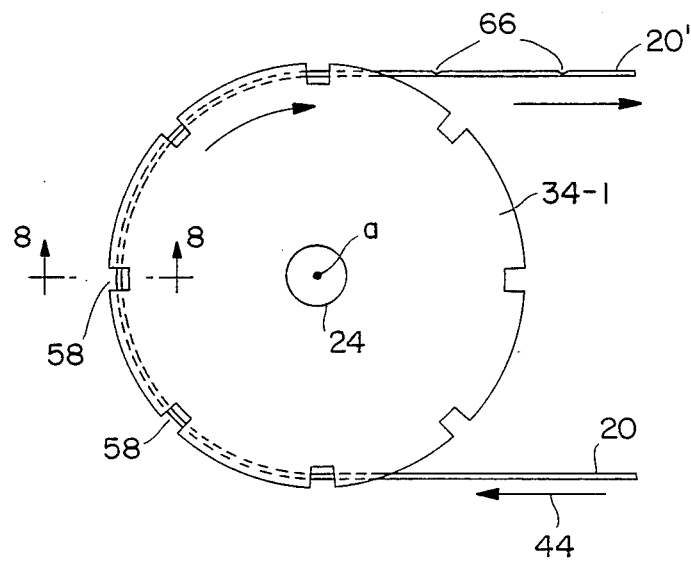
FIG. 7 is an enlargement of a portion of FIG. 1 showing the strand moving in position with one of the nicking wheels of FIG. 1.

In FIG. 7, the strand 20 is shown by the arrow 44 to be approaching the laser nicking wheel 34-1. The strand runs at least 90° around the grooved perimeter of this rotating wheel, and then the nicked strand 20' travels away from this wheel. The aperture notches 58 in the perimeter of this wheel permit access for one or more laser beams to form the scoop-nicks 66, as explained with reference to FIG. 1.

Figure 8:
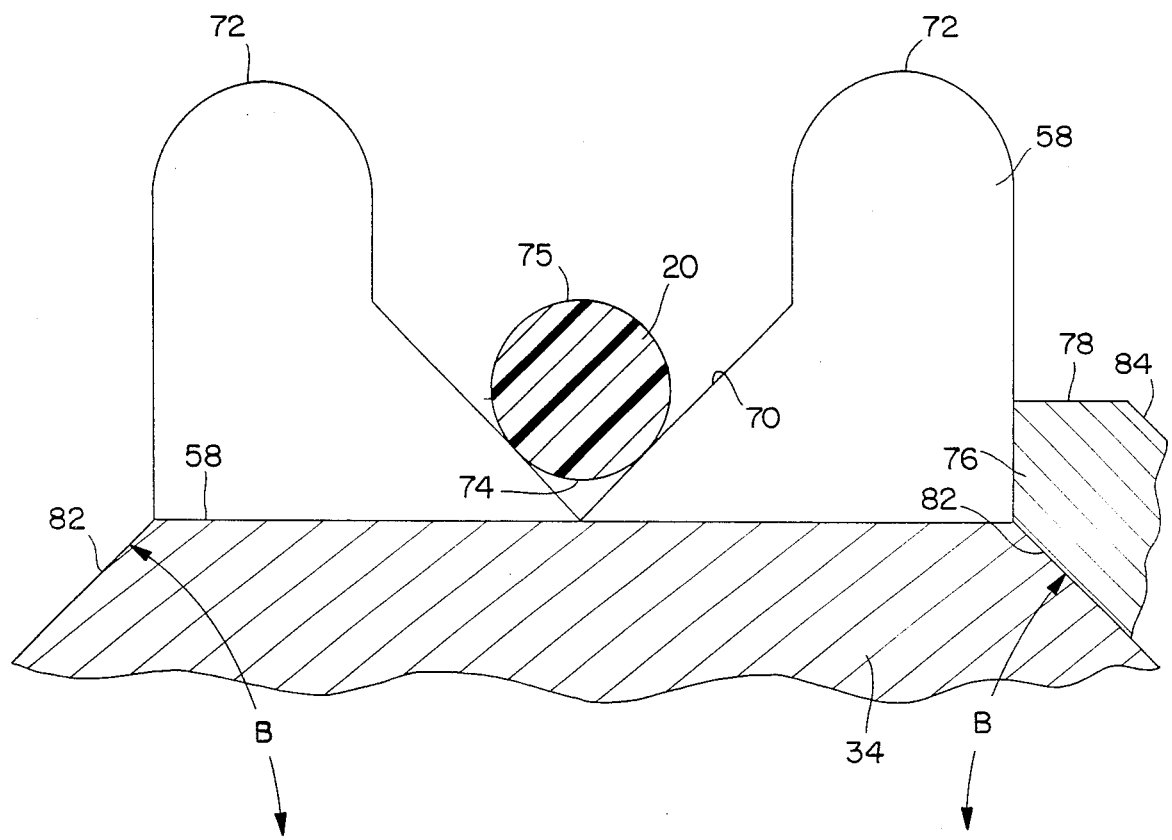
FIG. 8 is a greatly enlarged cross-sectional view taken along the line 8—8 in FIG. 7 through the rim of a nicking wheel.

As shown enlarged in FIG. 8, a laser nicking wheel 34 has a circumferential V-shaped groove 70, for example with sides sloping at 45° to the wheel axis, for carrying the strand 20. There are a pair of axially spaced, radially extending flanges 72 on opposite sides of the groove 70 serving as masking elements for blocking a laser beam 62 (FIG.1) from access to the strand 20, except for the locations of the respective aperture notches 58, each of which cuts through both of the masking flanges 72 and extends radially inwardly at least as far as the bottom of the V-shaped groove 70.

Thus, as will be appreciated from a consideration of FIGS. 7 and 8, a laser beam can be aimed at the strand 20 from either side of the wheel 34-1 and focused to hit the underside 74 or the upperside 75 of the strand 20 where it spans exposed across the aperture notch 58. When nicking both the underside 74 and the upperside 75, a masking disk 76 (FIG. 8) is not used.

When it is desired to form a scoop-nick 66 (FIG.2) on only one side of the nicked strand 20', an aperture masking disk 76 (FIG. 8) is mounted on the side of the laser nicking wheel 34 from which the laser beam 62 is incident. The rim 78 of this masking disk 76 is aligned with the strand 20 at a depth "d" (FIG. 2) corresponding to the desired lowest depth of the scoop-nick 66, below which the strand 20 remains unexposed to the laser beam.

The presently preferred configuration for the scoop-nick 66 is the single-sided arrangement as shown in FIGS. 2 through 4, because it is easier to form than the symmetrical pattern of FIGS. 5 and 6 and has been found to work to advantage in bending in any direction. The remaining material in the area "A" of the original cross-sectional area of the circular strand 20 serves as a hinge 135 for producing the desired sharply doubled-back bend 126 (FIGS. 12D and 12E) at the tips 65 (FIG. 18) of the hooks 67 while retaining a desired amount of strength for interconnecting the twinned hooks 67 at each tip 65.

Another preferred configuration is dual scoop-nicks, i.e. a scoop-nick 66-1 (FIGS. 5 and 6) plus an opposed scoop-nick 66-2 while omitting the other two scoop-nicks 66-3 and 66-4, for providing symmetrical bending in any direction.

The single-sided scoop-nicked strand 20' shown in FIGS. 2, 3 and 4 can be produced by the system and apparatus of FIG. 1 by using a laser nicking wheel 34 preferably having a masking disk 76 attached thereto, as shown in FIG. 8. Only one laser unit 60 is employed.

Figure 8A:
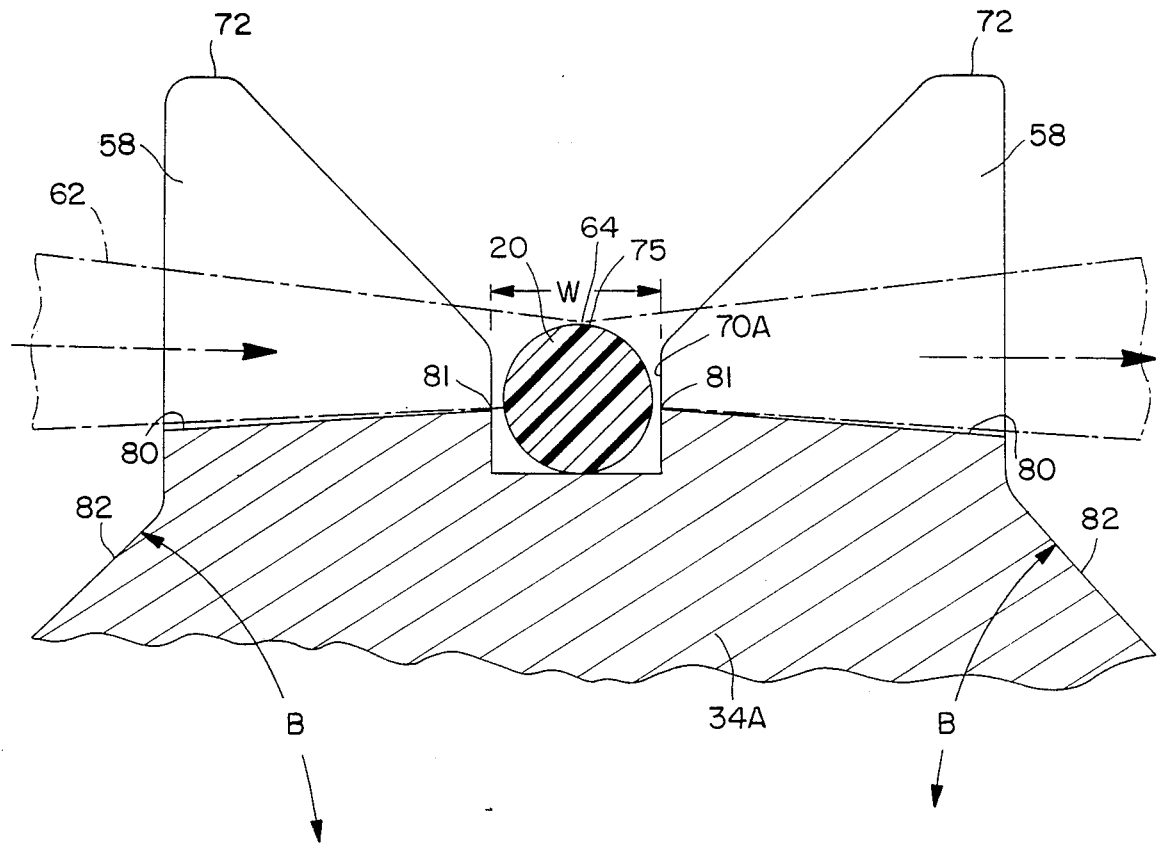
FIG. 8A is a cross-sectional view similar to FIG. 8 and showing an alternative embodiment of the nicking wheel and illustrating a focused laser beam impinging on the strand.

For producing the single-sided scoop-nicked strand 20' shown in FIGS. 2, 3 and 4, the alternative laser nicking wheel 34A of FIG. 8A can also be employed to advantage. The circumferential groove 70A has a generally square cross-sectional shape, and this groove is slightly larger in width "W" than the diameter "D" of the strand 20. For example, there is a clearance of 0.001 of an inch on each side of the strand 20. Thus, with "D" equal to 0.008 of an inch, "W" equals about 0.010 of an inch. It is to be noted that the aperture notches 58 in this modified nicking wheel 34A extend radially inwardly so that the inner limit 81 of their bottom surface 80 is aligned with the strand 20 at a depth corresponding with the desired depth "d" of the scoop-nick 66 in FIGS. 2, 3 and 4, and only the upper side 75 of the strand is exposed to the focus 64 of a laser beam 62 (FIG. 1). The configuration of this wheel 34A is preferred, because the masking effect of the aperture notch bottom surface 80 extends to the point 81 at the sidewall of the groove 70A (thus being very close to the strand 20, and thus close to the beam focus 64) for sharply and accurately delineating the masked region of the strand.

In summary, the scoop-nicks 66 have sufficient depth "d" (FIGS. 2 through 6) and have sufficient length "N" for providing hinges 135 permitting a relatively easy sharply doubled-back bend 126 (FIGS. 12D and 12E) to be formed with relatively closely spaced legs 69 (FIG. 18) in the formed twinned hooks 67 while leaving sufficient material in area "A" for providing a connecting hinge 135 at the tip 65 capable of retaining its integrity during manufacture of the hook medium.

Either pulsed laser beam generator units 60 or continuously operating units may be employed. If the single laser beam generator unit is pulsed, then the pulse is timed with the peripheral speed of the nicking wheel to produce scoop-nicks at evenly spaced distances "L". When using a pulsed laser beam, the periphery of the nicking wheel is a shallow V-groove, without apertures, thereby exposing the upperside of the strand continually around the perimeter of the wheel, and only single-sided scoop-nicks are formed by the timed pulses.

Instead of using four laser beam generating units 60, beam splitters and mirrors may be used.

It is preferred to use only a single laser beam generating unit 60 for producing the single-side scoop-nick 66 of FIGS. 2, 3 and 4, and that this unit be continuously operating for automatically creating each scoop-nick 66 as the respective aperture notch 58 moves through the beam focus 64, without need for using optical synchronization. Presently, a continuously operating laser unit 60, for example a $CO_2$ laser, provides more precisely shaped scoop-nicks, because the energy level of the laser beam is not fluctuating, and the repetition rate of pulsed lasers is a limitation on the speed of manufacture.

For reflecting the unfocused beam 62 away from the wheel for causing its energetic focus to be located harmlessly in the air, the nicking wheel 34 or 34A is made of hard aluminum, and its polished side surface 82 (FIGS. 8 and 8A) is sloped at a relatively large angle "B" to the axis "a", for example, at an angle of about 45°. The polished side surface 84 of the hard aluminum masking disk 76 (FIG. 8) is similarly sloped for the same reason. It is to be noted that the polished hard aluminum is an excellent reflector of the laser beam at the particular wavelength of a $CO_2$ laser unit.

Figure 9:
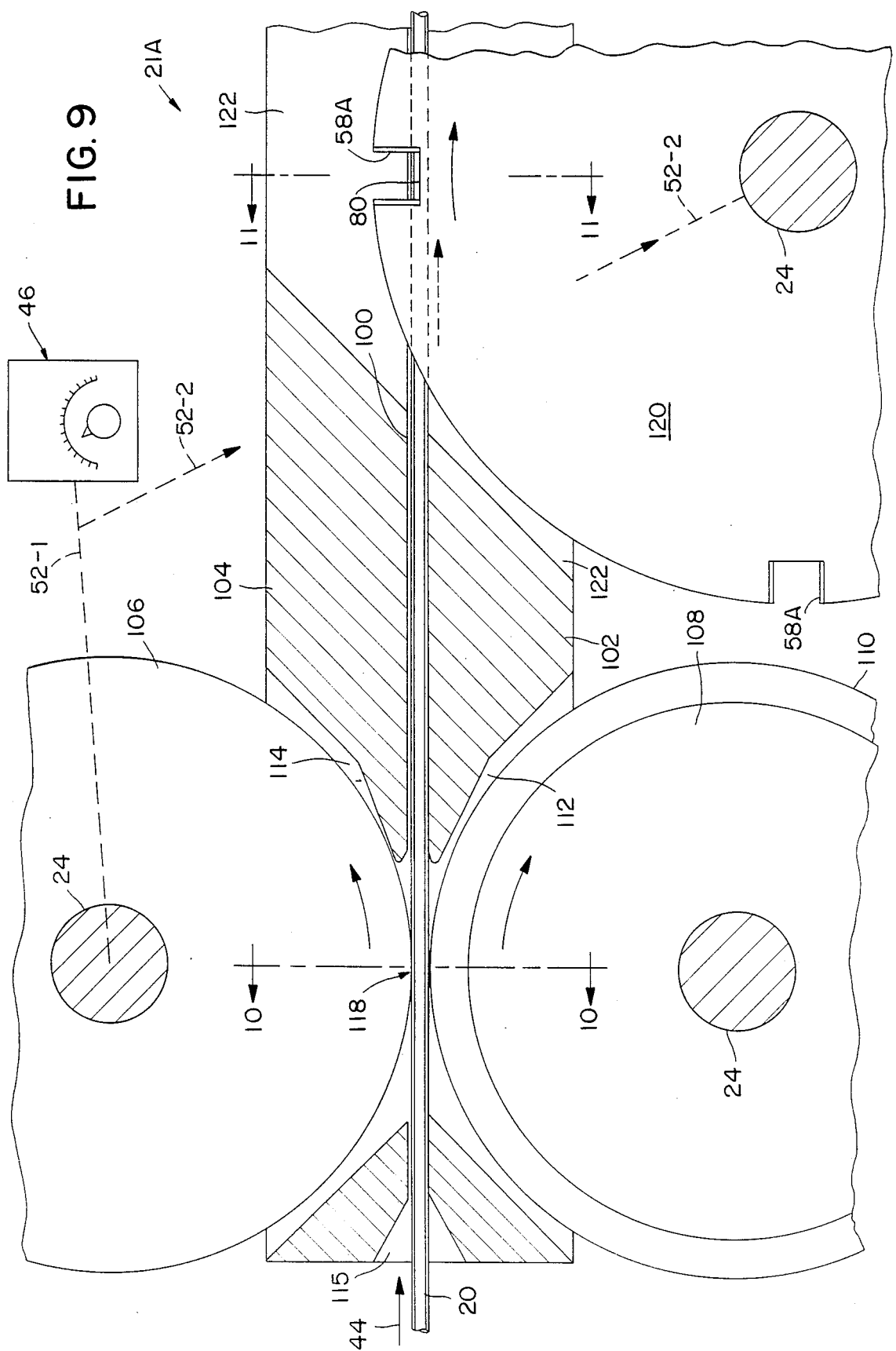
FIG. 9 is an enlarged elevational sectional view illustrating the method, system and apparatus for scoopnicking the strand while the strand is travelling along a straight path.
Figure 11:
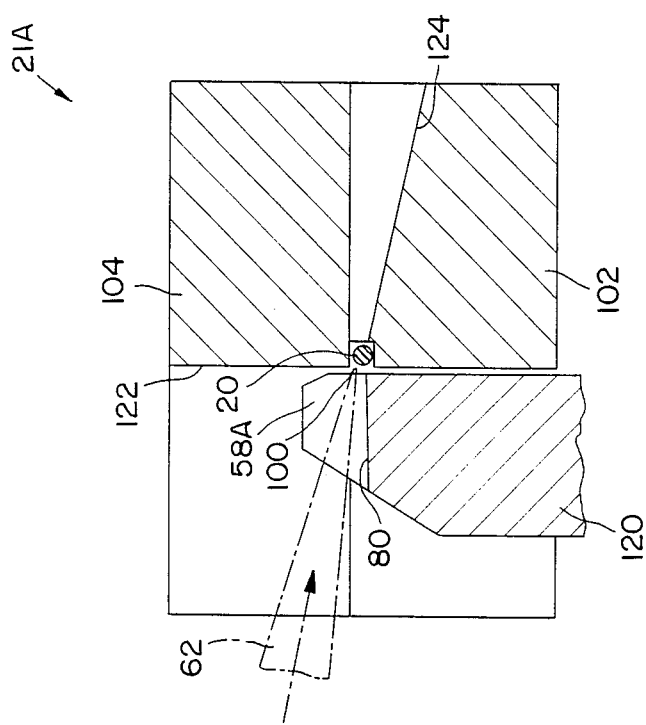
FIG. 11 is a cross-sectional view taken along the line 11—11 in FIG. 9 for showing a portion of the perimeter of a rotatable strand masking disk in relationship to the strand.
Figure 10:
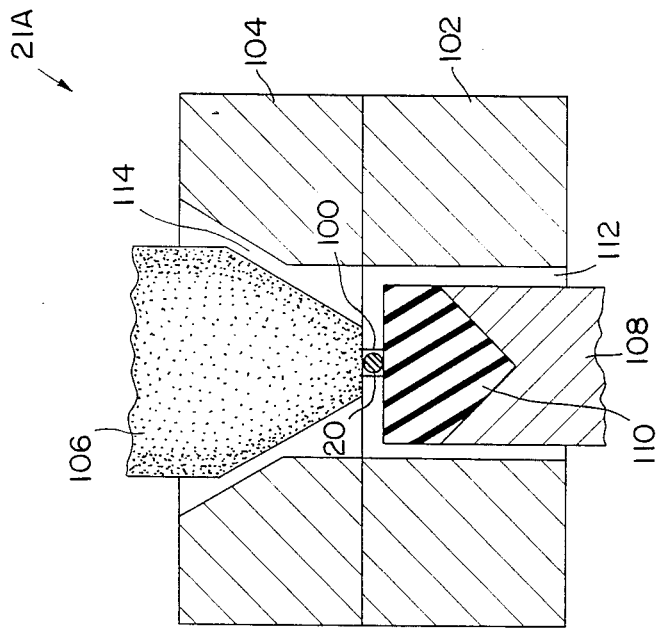
FIG. 10 is a cross-sectional view taken along the line 10—10 in FIG. 9 for showing features of the strand propelling wheels.

An alternative system and apparatus 21A in FIGS. 9, 10 and 11 produces a single-side scoop-nick 66 (FIGS. 2, 3 and 4) while the strand 20 is travelling along a straight path in a channel guide passageway 100 shown as having a square cross section. This passageway 100 is cut in a bottom guide block 102 and is covered by a removable upper block 104, thus making the full length of this passageway 100 accessible. For example, these blocks 102 and 104 are formed of hard aluminum and the four walls of the channel passageway 100 are coated with slippery plastic, e.g. "Teflon" PTFE plastic, for minimizing friction and for extending the life of the passageway. The strand 20 is being fed as indicated by the arrow 44 from a suitable supply, for example from a winding 26 (FIG. 1) on a supply reel 22.

In order to propel the strand 20 along the passageway 100, there is a drive wheel 106 such as a hard grinding wheel of fine grit, shaped to have a narrow rim as seen in FIG. 10. Directly opposed to this drive wheel 106 is a supporting wheel 108 having a rim 110 of hard rubber for supporting the strand 20 against the rim of the drive wheel. This supporting wheel 108 is lightly biased toward the drive wheel 106 for gripping the strand 20 against the drive wheel in friction driving relationship. The blocks 102 and 104 have opposed clearance openings 112 and 114 for receiving these two wheels. The channel passageway 100 has a funnel entrance 115 (FIG.9), and there is a driving region 118 between the opposed wheels 106, 108. Controllable speed drive means 46, including a motor, is coupled as indicated at 52-1 to the shaft 24 of the drive wheel 106.

For producing the scoop-nicks 66 (FIGS. 2, 3 and 4), there is a rotatable masking wheel 120 which is coupled to the drive means 46 as indicated at 52-2 for causing the perimeter of this masking wheel to move in the same direction as the strand 20 and at the same speed of travel as the strand. As shown most clearly in FIG. 11, the side portions of the guide blocks 104, 102 are milled away at 122 for providing clearance for the perimeter of the masking wheel 120 to be located immediately adjacent to the guide channel 100. In the perimeter of this masking wheel 120 are uniformly spaced aperture notches 58A for exposing the moving strand 20 to the scoop-nicking effect of the focus of a laser beam 62. There is a diverging tunnel 124 in the block 102 for allowing the laser beam 62 to pass harmlessly beyond after nicking the strand travelling along the channel 100. The bottom 80 of this aperture notch 58A is aligned with the strand 20 at a depth "d" (FIG. 2) corresponding to the lowest portion of the scoop-nick 66 below which the strand remains unexposed to the laser beam. The circumferential length of the aperture notch 58A corresponds generally with the desired axial length "N" of the scoop-nick 66 in FIG.2.

Figure 23:
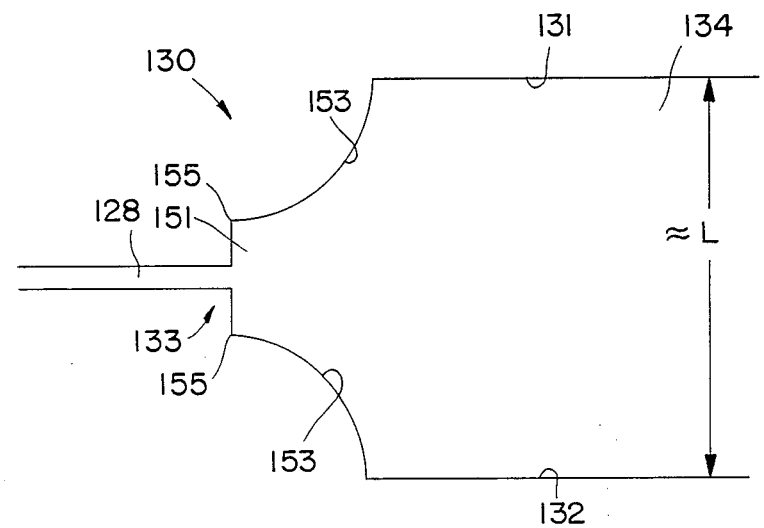
FIG. 23 is an enlarged partial plan view for clearly showing an advantageous configuration of the zigzag guide sidewalls near the entrance to the zigzag chamber in FIG. 13 or 13A.

The nicked strand 20' is formed into sharply doubled-back bends 126 (FIGS. 12A-12E) in a zigzag configuration by the method shown in these FIGURES. The strand is fed endwise along a channel guide passageway 128 leading into a zigzag station 130 having opposed guide sidewalls 131 and 132. The floor to ceiling height of this passageway 128 is equal to "W" in FIG. 8A. At the entrance 133 into the zigzag station, these sidewalls 131, 132 are initially spaced apart somewhat more than the diameter "D" of the nicked strand 20', for example, their spacing is 1.7D for providing clearance for accommodating the "flash" or "feathers" of strand material which sometimes project from the nicked strand 20' near the shoulders 68 (FIGS. 2 and 5) as a result of laser beam action. These sidewalls 131 and 132 are shaped in the zigzag station 130 as shown in FIG. 23 for facilitating the sharply doubled-back zigzag bending of the nicked strand 20'.

Leading from the zigzag station 130 in the downstream direction is an outlet passageway 134. It is noted that the nicked hinge regions 135 of the strand 20' are uniformly spaced apart in the axial (longitudinal) direction by the distance "L" on centers as explained with reference to FIGS. 2 and 5, and the straight segments of the nicked strand between these hinge regions 135 are indicated by the reference numerals 137. The guide sidewalls 131 and 132 in the outlet passageway 134 are spaced apart by a lateral spacing slightly greater than "L" for accommodating downstream travel of the closely spaced zigzagged strand configuration 140 (FIG. 12E).

In order to cause the endwise travelling nicked strand 20' initially to begin bending back and forth into the zigzag configuration 140, there is a movable and removable barrier 138 initially positioned in the downstream end of the zigzag station 130. As shown in FIGS. 12A-12E, this removable barrier 138 is a strip of plastic of the same material as the nicked strand 20' or a strip of material having similar bending characteristics. This barrier strip 138 has a thickness about equal to "D" and contains multiple parallel slits 139 (FIG. 12B) extending perpendicular to both margins of the strip and being spaced from each other along the length of the strip by a distance about equal to "D". These slits 139 terminate near the centerline of the barrier strip 138 for leaving an uncut internal median portion 149 extending for the entire length of the strip. The reason for the multiple slits 139 is to cause this removable barrier, when pulled downstream as shown by the arrow 143 in FIG. 12E, to behave in bending and forming characteristic somewhat like the closely spaced zigzagged strand configuration 140 which is now following closely behind the withdrawing barrier 138.

Figure 12A:
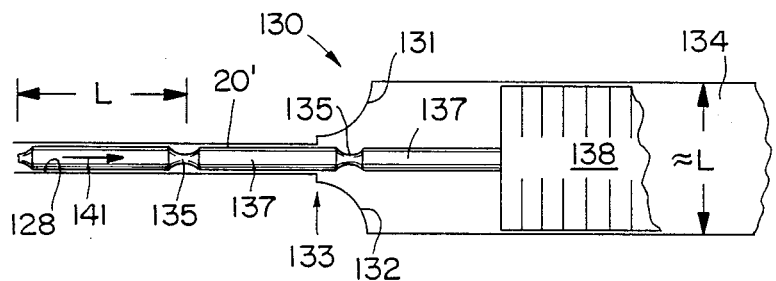
FIGS. 12A through 12E are plan view diagrammatic illustrations of the zigzag station for showing the bending of the pre-nicked strand into a closely spaced zigzag configuration having sharply doubled-back bends at the hinges formed by the strand material remaining in the scoop-nicked regions.
Figure 12B:
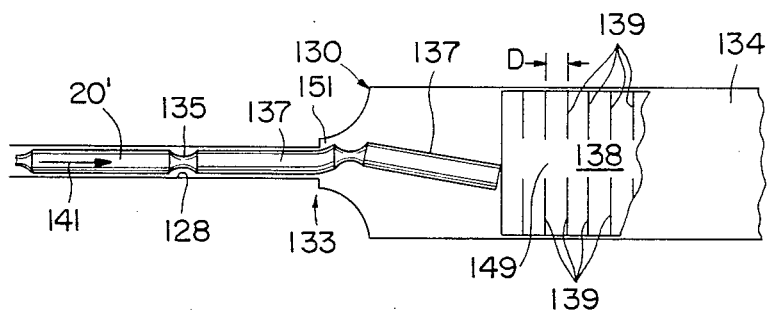
Figure 12C:
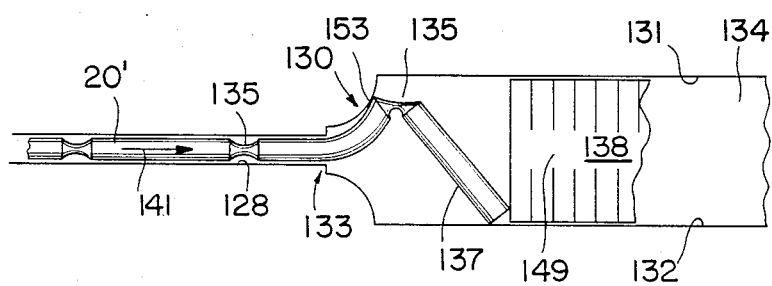
Figure 12D:
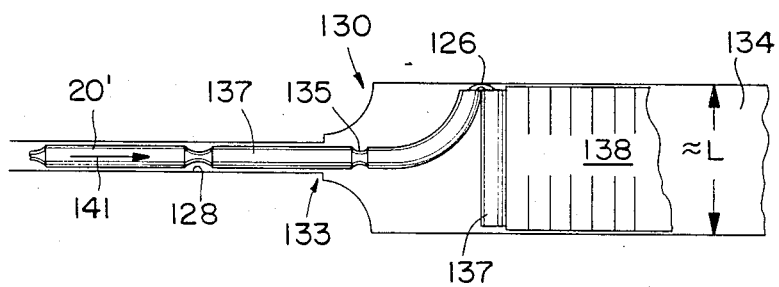
Figure 12E:
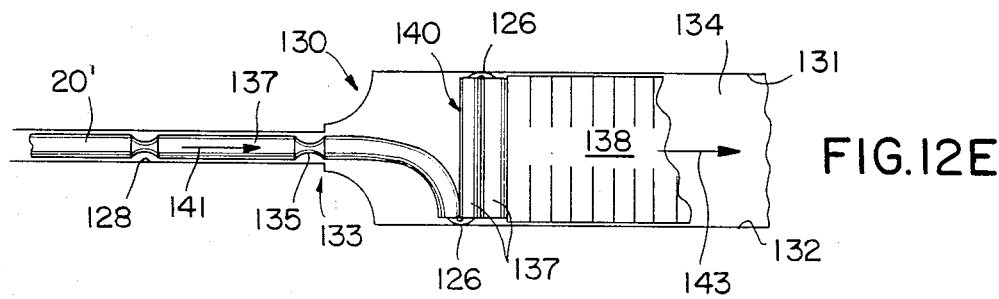

As shown in FIG. 12A, the first straight segment 137 of the strand 20' encounters this barrier 138, causing flexure of the first nicked (hinge) region 135, as shown in FIG. 12B. FIGS. 12B and 12C show the progressive bending of this first hinge region 135. FIG. 12B shows the second straight segment 137 beginning to bend. FIG. 12C shows further bending of the second straight segment 137. It is to be noted in FIG. 12B that the critically important sudden widening 151/(FIG. 23) of the zigzag chamber 130 immediately inside of the entrance 133 forms a widened entry 151 for allowing the first hinge region 135 to be deflected laterally with respect to the centerline of the incoming passageway 128 and allows the second straight segment 137 to begin bending for accommodating this lateral deflection of this first hinge. It is to be noted in FIG. 12C that the convex side guidewall at 153 just downstream from the widened entry 151 provides a fulcrum for supporting the bending of the second straight segment 137 for propelling the bending first hinge 135 downstream toward the barrier 138, which is stationary in FIGS. 12A-12D.

FIG. 12D shows the completed doubled-back bending of the first hinge region to form the first sharply doubled-back bend 126. FIG. 12E shows the forming of two completed sharply doubled-back bends 126. The closely spaced zigzag configuration 140 is beginning to form in FIG. 12E, and the barrier 138 is now beginning to be pulled downstream, as indicated by the arrow 143.

A particularly successful configuration for the guide sidewalls of the zigzag chamber 130 is shown greatly enlarged in FIG. 23. Immediately downstream from the entrance 133, there is an abruptly widened entry 151. The width of this widened entry 151 from one corner 155 to the other corner 155 is at least about 6D and in this embodiment is about 9D. The convex side guidewalls 153 advantageously provide fulcrum surfaces as seen in FIG. 12C. These convex side guidewalls 153 are contiguous with the corners 155 of the widened entry 151 and have a radius of curvature of at least about 10D, and in this embodiment their radius of curvature is about 12D. The longitudinal distance, center-to-center, from one hinged region 135 to the next is defined as "L", and this dimension "L" relates to the desired overall hook configuration. The distance between the sidewalls 131 and 132 in the outlet passageway 134 is slightly greater than "L" for providing clearance for free downstream movement of the closely spaced zigzagged strand 140.

Figure 13:
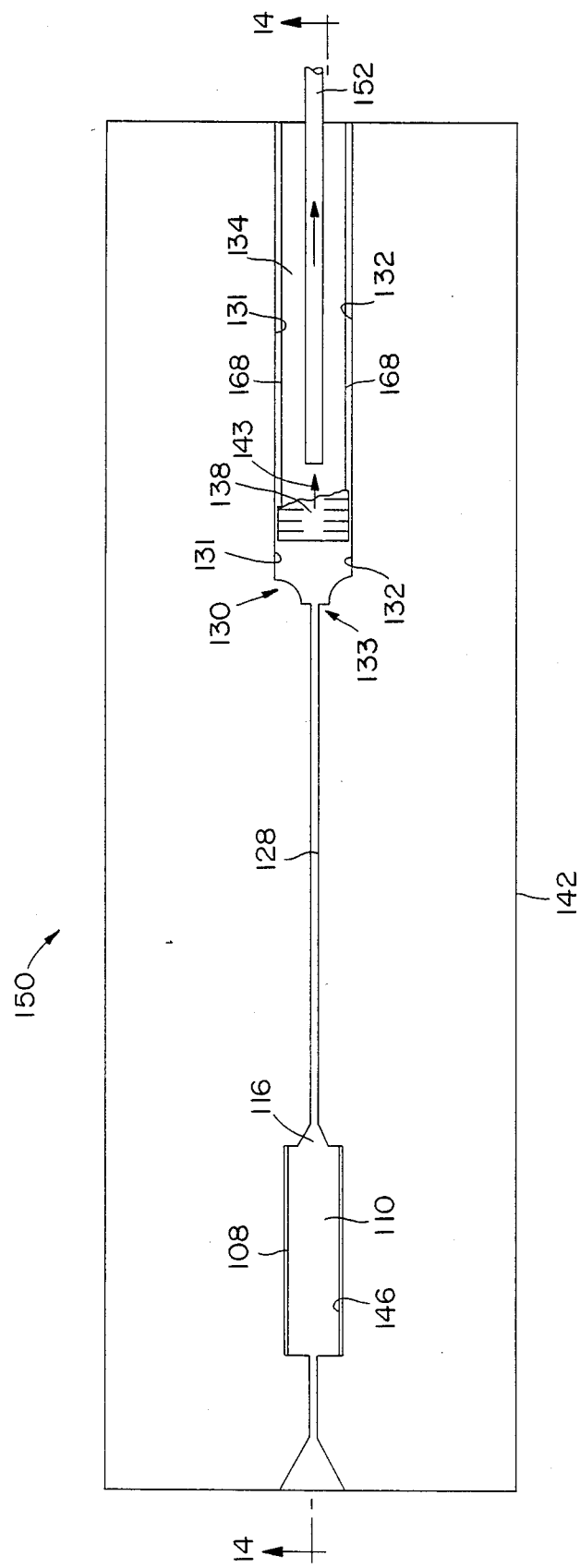
FIG. 13 is a top plan view of the zigzag station as seen looking down along the plane 13—13 in FIG. 14.
Figure 14:
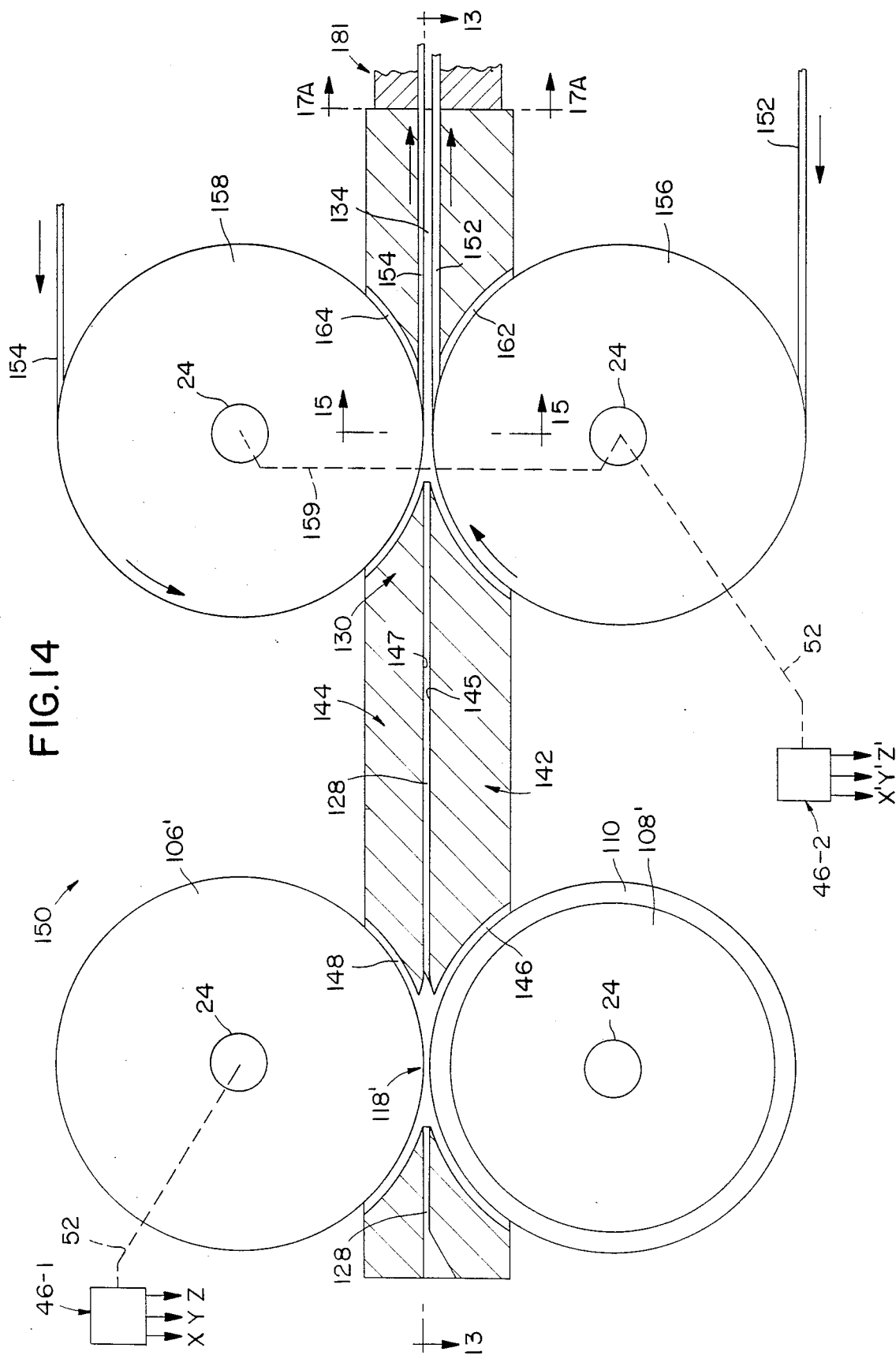
FIG. 14 is a side elevational sectional view of the zigzag station as seen along the central plane 14—14 in FIG.13.

To feed the nicked strand 20' downstream along the channel guide passageway 128 in FIGS. 12A-12E into the zigzag station 130, a zigzag system and apparatus 150 (FIGS. 13 and 14) are provided. The channel guide passageway 128 as shown has a square cross section and is cut into the bottom guide block 142 covered by a removable upper guide block 144 (FIG.14), thus making the full length of this passageway accessible. These blocks 142, 144 are formed of material similar to the blocks 102, 104 in FIGS. 9-11, and the passageway 128 is coated with slippery plastic similar to the passageway 100. The nicked strand 20' (FIGS. 12A-12E) is being fed, as indicated by the arrow 141, from a suitable supply, for example from a winding 37 (FIG. 1) on a reel 38. For propelling the nicked strand along passageway 128 (FIG. 14), there is a drive wheel 106' and a supporting wheel 108', both similar to the wheels 106 and 108 (FIGS. 9 and 10), for providing a driving region 118'. These wheels 106', 108' run in clearance openings 148 and 146 in the respective blocks 144 and 142. The drive wheel 106' is driven at controlled speed by means of a transmission 52 coupled to the controllable speed drive 46-1. The floor 145 of the channel guide passageway 128 is formed by the bottom of the cut in the guide block 142, and this floor 145 becomes much wider laterally in the downstream outlet passageway 134 as seen in FIGS. 13 and 23. The ceiling 147 of these passageways 128 and 134 is provided by the lower surface of the removable upper guide block 144.

For retaining and feeding the zigzagged configured strand 140 downstream through the outlet passageway 134, there are lower and upper retainer feed belts 152 and 154 carried by lower and upper circumferentially grooved pulley wheels 156 and 158, respectively. This pair of pulley wheels 156, 158 is mechanically ganged together by mechanical ganging transmission means as indicated at 159 for always rotating at the same speed in opposite directions, for example by a pair of meshing herring bone gears of equal pitch diameter mounted on the respective pulley wheel shafts 24. These pulley wheels 156, 158 are driven at a controlled speed considerably slower than the drive wheel 106' (for causing formation of the zigzag configured strand 140 [FIG. 12E]) by connection through a transmission 52 to a controllable speed drive 46-2 which is set to a considerably slower speed than the drive 46-1. The retainer feed belts 152 and 154 run in grooves in the floor and ceiling of the outlet passageway 134. The pulley wheels 156, 158 run in clearance openings 162, 164 in the lower and upper guide blocks 142, 144.

In order to produce a zigzag strand configuration 140 (FIG. 12E) in which the respective straight segments 137 of the nicked strand are relatively closely spaced one to another, the ratio of the slower speed of the retainer feed belts 152, 154/(FIGS. 14 and 15) to the faster speed of the perimeter of the drive wheel 106' is adjustable and is somewhat more than the ratio of D/L. The smaller speed ratios nearer the value of D/L produce a closer positioning of these straight segments 137 than somewhat larger speed ratios. The reason for the adjustability in the speed ratio is to accommodate variations in strands diameter as actually manufactured, changes in strand diameter due to moisture absorption, the presence of particles between adjacent segments 137 and to accommodate the bending characteristics of the hinges 135.

In starting operation of the zigzag station 130, the movable and removable barrier 138 is initially inserted so that the inner end of this barrier 138 is initially positioned near the beginning of the outlet passageway 134, as shown in FIGS. 12A–12E and 13. The nicked strand 20' begins to bend sharply back and forth as shown in FIGS. 12B through 12D, thus beginning to create the closely spaced zigzag configuration 140 (FIG. 12E). After this zigzag configuration 140 begins forming, the barrier 138 is moved downstream as shown by the arrow 143 for allowing the front portion of the zigzag configured strand 140 (FIG. 12E) to become captured between the retainer feed belts 152, 154, so that the now continuously forming zigzagged strand configuration 140 is carried downstream through the outlet passageway 134 by these belts 152, 154.

Although the nicked strand 20' in FIGS. 2 and 5 is shown with cleanly formed scoop-nicks 66, it is to be understood that the laser beam or beams may leave some outwardly flashed material at either end of the nicked region (hinge) 135 near the shoulders 68. Thus, when the sharply doubled-back bends 126 are formed (FIG. 12E) by folding these hinge regions 135, there may be some outwardly flashed material like small "feathers" adjacent to these bends 126. For providing clearance to accommodate free movement of the zigzag configuration 140 having this flashed material, the outlet passageway 134 is provided with a pair of parallel enlarged gutter grooves 168 (FIGS. 13 and 15) located immediately adjacent to the two respective guide sidewalls 131, 132 along the outlet passageway 134. If desired for causing the plastic material in these sharply doubled-back bends 126 to take a permanent set, these bends 126 are first heated to their softening temperature by heating means comprising a plurality of parallel forwardly inclined hot air passages 172 (FIGS. 15A and 15B) machined in the lower guide block 142. (Subsequent cooling permanently sets the doubled-back bends 126.) As seen in the partial plan view of FIG. 15B, these hot air passages communicate through the sidewall 131 with gutter groove 168 and are aimed forwardly at an angle "F" relative to sidewall 131 in the downstream direction in relation to the outlet passageway 134. For example, angle "F" is in the range from about 20° to about 50°. Thus, continuously desiccated heated air 174 at a temperature exceeding the softening temperature of the thermoplastic material of the sharply doubled-back bends 126 (FIG. 12E) serves to soften the bent plastic hinge material 135 of these bends. This forwardly aimed flow 174 of dried heated air also serves to propel the zigzag strand configuration downstream for aiding the retainer feed belts 152, 154, as shown by the arrows 175 in FIG. 15B. This heated air flow 174, 175 may be pulsed, if desired, for aiding the propelling action. It is to be understood that the other sidewall 132 has a similar plurality of forwardly aimed hot air passages arranged as a mirror image of those in sidewall 131 and communicating therethrough for providing a symmetrical dried heated air flow arrangement along both of the sidewalls 131 and 132 and along the respective gutter grooves 168. The reason for using dried heated air is that the presently preferred nylon material is hygroscopic, and some of the moisture becomes expelled during heating. The dried heated air advantageously carries away such moisture, rather than allowing moisture to accumulate in the equipment.

In the hook production method and system 180 shown in FIG. 16, there is a support track 181 extending downstream from the guide blocks 142, 144 of the zigzag station 130 and leading into a thermally insulated housing 182 containing a hook shaping zone 184 and a hook setting zone 186. A thermally insulated partition 185 within this housing separates the shaping zone 184 from the setting zone 186. A pair of endless flexible shaping belts 187 and 188 revolve in synchronism in opposite directions, as shown by the arrows 189. The upper shaping belt 187 is revolving counterclockwise and the lower shaping belt 188 clockwise, passing through ports 191 in the partition 185. The upper belt 187 revolves around input and output rolls 190 and 194, respectively, while the lower belt 188 revolves around input and output rolls 192 and 196, respectively. For guiding these belts 187 and 188 and keeping them tracking together in parallel relationship, the rolls 190, 192, 194, 196 each has a plurality of narrow circumferentially extending pulleytype peripheral flanges, as indicated partially at 198, straddling the respective belts.

Figure 17A:
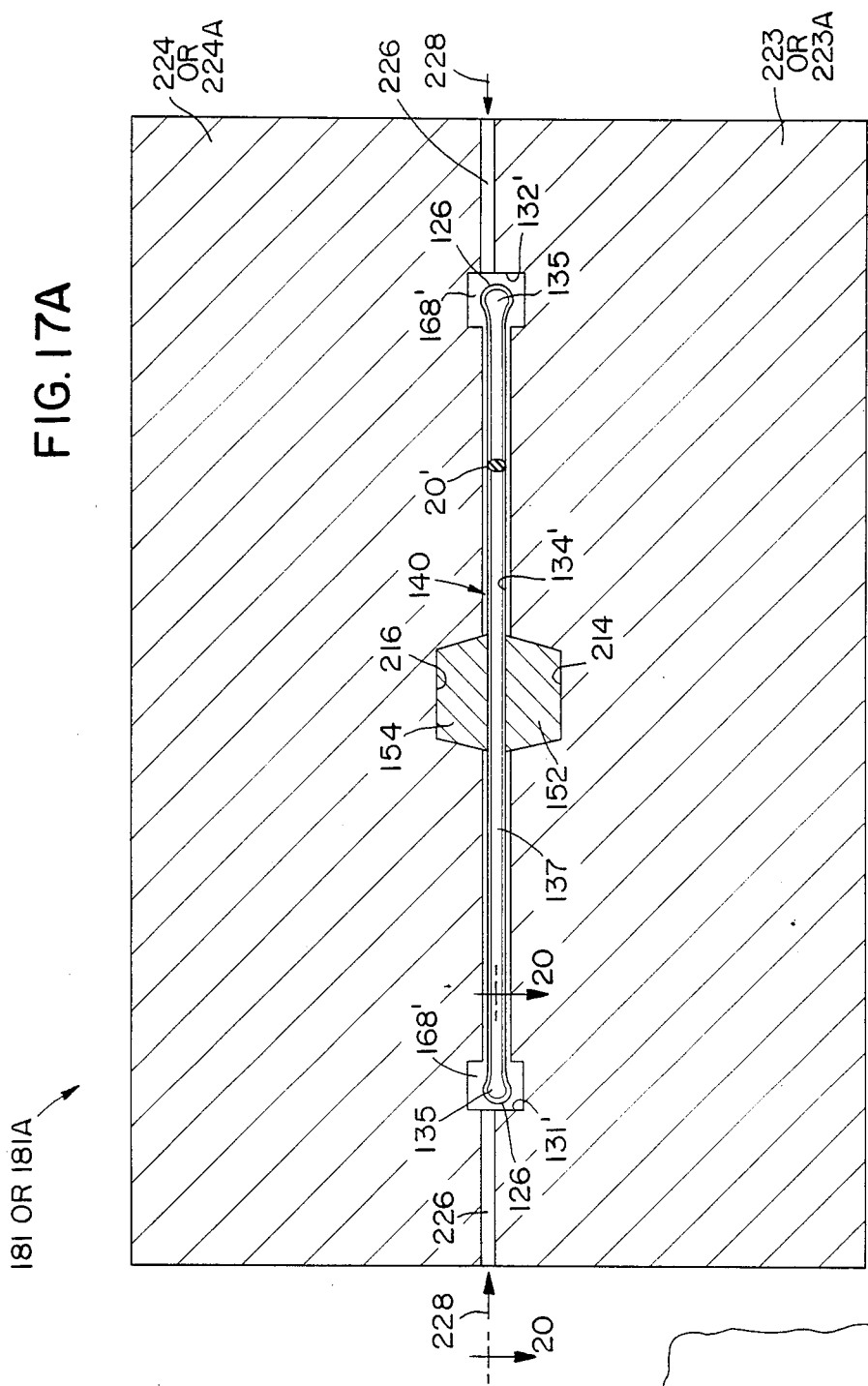
FIGS. 17A and 17B are enlarged cross-sectional views taken along the lines 17A—17A and 17B—17B, respectively, in FIG. 16.
Figure 17B:
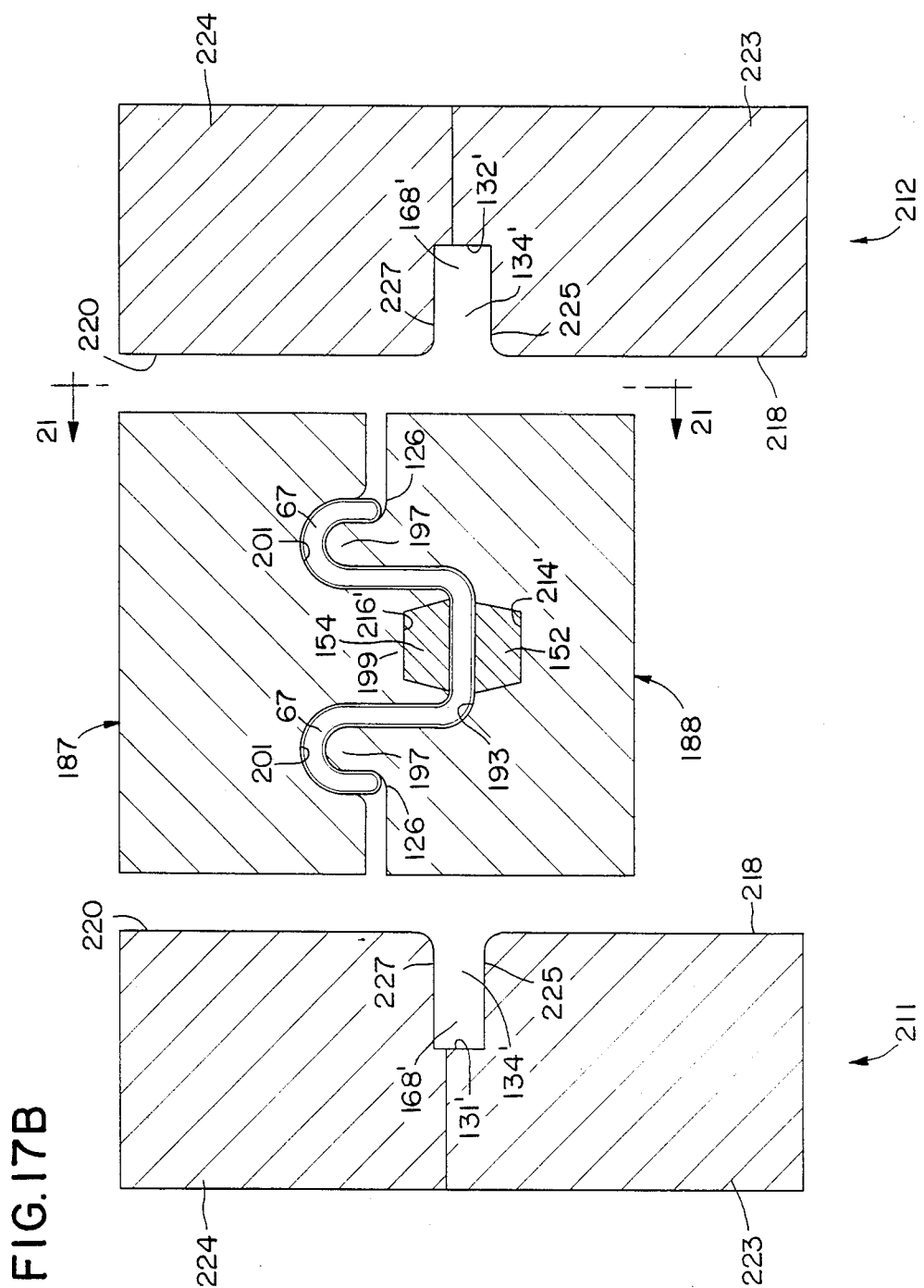

The front surfaces (outer surfaces) of the respective belts 187 and 188 are configured as shown greatly enlarged in FIG. 17B for shaping and setting the zigzagged strand 140 (FIG. 12E) into the hooks 67 shown in FIG. 18.

The outer (front) face of the lower hook shaping belt 188 includes a longitudinal recess 193 for forming the mounting portions 195 (FIG. 18) of the respective hooks 67. This recess 193 has a central longitudinal channel 214' in the bottom thereof for receiving the lower retainer feed belt 152. There are a pair of parallel longitudinal humps or shoulders 197 on either side of the recess 193 for forming the curved arch-shaped head portion "H" of each hook 67. The cooperating mating front face of the upper belt 187 includes a longitudinal ridge 199 which enters the recess 193 for shaping the hook mounting portions 195. This ridge has a central longitudinal channel 216' for receiving the upper retainer feed belt 154. There are a pair of parallel longitudinal valleys 201 on either side of the ridge 199 into which enter the humps or shoulders 197 for shaping the head portions "H" (FIG. 18) of the hooks 67. The retainer feed belts 152 and 154 revolve around with the shaping and setting belts 187, 188 and then leave the insulated housing 182 through exits 203 (FIG. 16), and these retainer feed belts are led back to the pulley wheels 156, 158 (FIG. 14) by idler pulleys 205 (FIG. 16).

In order to shape and set the hooks 67, a first chamber 200 enclosing the shaping zone 184 is heated by means of a gas or other heater 202 to a temperature slightly above the softening temperature of the material of the zigzagged strand. A sequence of radiant heaters 204 are aimed at the front surfaces of the two revolving belts 187, 188 as they travel around the respective input rolls 190, 192 just prior to their reaching the nip region 206 between these two rolls. In the nip region 206 (please see also FIG. 21), these heated belts 187, 188 mate together forming the hooks 67 from the zigzagged strand 140 (FIG. 12E), as seen in FIGS. 17B and 18.

A plurality of smaller diameter rollers 208 (FIG. 16) extending transversely and engaging the rear (inside) surfaces of the belts 187, 188 support and guide these interfitted belts as they travel downstream from the nip region 206. The shaped heated hooks are then "set" by cooling them in the hook setting zone 186, as will be explained later.

The support track 181 (FIGS. 14, 16, 17A, 17B and 21) for conveying the zigzag strand configuration 140 from the outlet passageway 134 (FIG. 14) of the zigzag station 150 into the hook shaping zone 184 (FIG. 16) will now be described. This support track 181 (FIG. 17A) defines a passageway 134', which serves as a downstream extension of the outlet passageway 134 (FIG. 15). Support track 181 comprises lower and upper members 223 and 224 (FIG. 17A). The retainer feed belts 152 and 154 (FIGS. 14 and 15) travel downstream in channels 214 and 216 in the lower and upper members 223 and 224, respectively. There are grooves 168' serving as downstream extensions of the grooves 168 of FIGS. 13 and 15 for carrying the sharply doubled-back bends 126 in the hinges 135 of the zigzag strand 140.

In order to "set" the previously heat-softened hinge material 135 in the sharply doubled-back bends 126, these bends are cooled by a plurality of forwardly inclined cold air passages 226 machined in the lower block 223 of the support track 181. As seen in the partial plan view of FIG. 20 (located adjacent to FIG. 17A), these cold air passages 226 communicate through the sidewall 131' with the groove 168' and are aimed forwardly at the same angle "F" as in FIG. 15B relative to the sidewall 131' in the downstream direction in relation to the outlet passageway 134'. Cooled dried air 228, which is at or below room temperature, flowing through the passages 226 serves to set the bent and previously heat-softened hinge material 135 of the sharply doubled-back bends 126 (FIG. 12E). This forwardly aimed cooled air flow 228 also serves to propel the zigzagged strand downstream for aiding the retainer feed belts 152, 154 as shown by the flow arrows 229 in FIG. 20. This cooled air flow 228, 229 may be pulsed, if desired, for aiding the propelling action at the same frequency as the heated air flow 174, 175 in FIG. 15B. It is to be understood that the cold air passages 226 at the right margin groove 168' and wall 132' are arranged as the mirror image of those passages 226 at the left margin, as already have been described, for providing a symmetrical cooled air flow arrangement along both track sidewalls 131' and 132' and along the respective track grooves 168'. Thus, the sharply doubled-back bends of the zigzagged strand 140 (FIG. 12E) are set before this zigzagged strand enters the housing 182 (FIG. 16).

In order to accommodate convergence and mating together of the heated shaping belts 187 and 188 as seen in the nip region 206 in FIG. 21, the support track members 223 and 224 are milled away at 218 and 220 (please see also FIG. 17B). Thus, by this milling the downstream ends of these track members 223 and 224 are formed into left margin and right margin guide tracks 211 and 212, respectively, which straddle the nip region 206 and terminate as shown in FIG. 16 near this nip region. The convergence and mating of the heated shaping belts 187 and 188 shapes the hooks 67.

For enabling the sharply doubled-back bends 126 to be withdrawn freely from the grooves 168' of the left and right margin tracks 211 and 212 (FIG. 17B), the floor and ceiling 225 and 227, respectively, of these grooves are made flat. Thus, in effect the respective grooves 168' are opened laterally inwardly toward the converging shaping belts 187 and 188. As these heated shaping belts approach each other, they progressively shape the hooks 67 and the sharply doubled-back bends 126 become withdrawn from the left and right margin tracks 211 and 212.

For setting the hooks (FIG. 16), the revolving mated belts 187, 188 travel downstream through port 191 in the partition 185 and enter a second chamber 232, a cooling chamber, in which the setting zone 186 is located for cooling the shaped hooks to a reduced temperature below their softening temperature. In this setting zone 186, the belts 187, 188 are cooled to a suitable temperature by means of coolers 234 arranged to blow cooled air onto the rear (inside) surfaces of the mated belts. Also, the output rolls 194, 196 may be hollow and be internally cooled by circulating cooling fluid within them. These output rolls 194, 196 are ganged together for rotation at the same peripheral speed in opposite directions by mechanical ganging means 159, for example, similar to that already described with reference to FIG. 14, and these output rolls 194, 196 are driven at a controlled speed by connection through a transmission 52 to a controllable speed drive 46-3. It is to be understood that the respective speeds of the controllable speed drives 46-1 and 46-2 in FIG. 14 and the speed of the controllable speed drive 46-3 in FIG. 16 are all under the simultaneous control of a control station 236 as indicated by the respective electrical connections XYZ, X'Y'Z' and X"Y"Z" for maintaining predetermined desired ratios between their speeds regardless of the particular speed at which the overall zigzag system and apparatus 150 (FIG. 14) and the hook production system and apparatus 180 (FIG. 16) are being run.

The row 238 of hooks 67 is carried out through the exit 240 by a channel guide or chute 242 (FIG. 16).

As shown in FIGS. 19A through 19H, the hook rows 248 are mounted at a desired pitch (longitudinal spacing) upon a substrate 244 (FIG. 18). In order to set the pitch of the row of hooks 238 for forming the mounted hook rows 248, the guide channel or chute 242 leads to a pitch-setting station (not shown) in which a leading portion of the row hooks 238 is pulled at a predetermined speed faster than the exit velocity 241 in FIG. 16.

It is to be understood that more than one row 238 of hooks can simultaneously be formed by a multiplicity of zigzag forming and hook shaping lines operating simultaneously in parallel relationship, being supplied simultaneously by a multiplicity of the nicked strands 20'. For convenience of explanation and understanding, only a single passageway 128 and a single zigzag chamber 130 have been described, it being understood that a multiplicity of them can be operating simultaneously in parallel feed relationship. The hook shaping zone 184 and hook setting zone 186 can comprise a multiplicity of hook shaping and setting lines operating simultaneously in parallel feed relationship.

The multiple rows 238 of hooks pass through the pitch-setting station (not shown) as described above, and are fed to an ultrasonic bonding station, for example, such as in FIG. 5C of U.S. Pat. No. 4,615,084, for securing bonded rows 248 of hooks at the desired pitch to a substrate 244, for example, such as the one of the various substrates described in said patent.

If it is difficult to bond the rows of hooks 238 to the substrate 244 by ultrasonic welding for forming mounted hook rows 248, then a thin flexible strip 246 (FIG. 18) of material readily bondable, for example, a strip of nylon material, may be interposed between the mounting portions 195 of the hooks 67 and the substrate 244.

Figure 24:
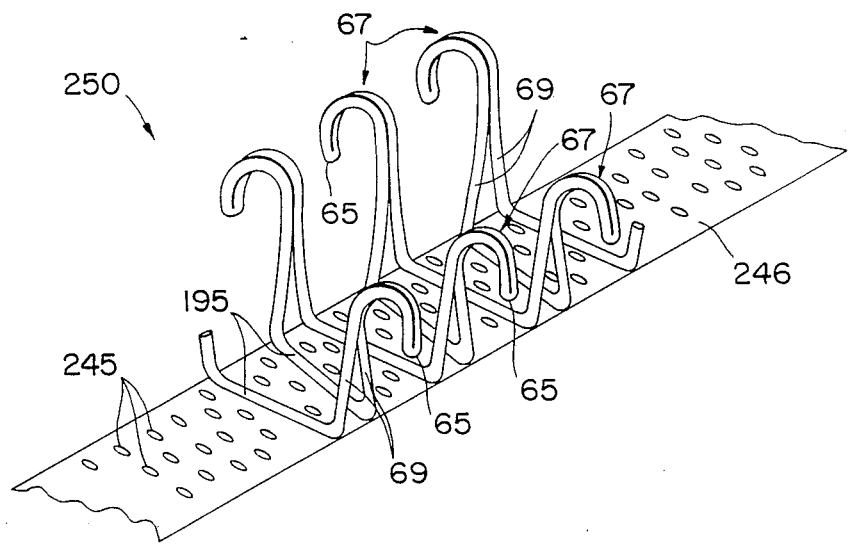
FIG. 24 is a perspective view of a hook fastener product embodying features of the invention.

In cases where the substrate 244 is porous, perforated and/or fibrous, the bonding may advantageously occur mechanically by ultrasonically melted portions of the strip 246 intertwining, interlocking, or keying with portions of the substrate. The flexible nylon strip 246 may be perforated as shown in FIG. 24 at 245, and then a bonding to the substrate 244 is achieved by a self-setting adhesive mechanically interlocking with the substrate and with the perforations 245 of the strip 246. If, for example, the hooks 67 are formed of polypropylene monofilament, then the strip 246 is of an ultrasonic-ally-bondable compatible material, for example, polypropylene.

An additional advantageous, intermediate, hook-and-strip product 250 (FIG. 24) is provided by bonding the hook mounting portions 195 to a flexible strip 246 having perforations or porosity 245. This bonding between the hooks 67 and the strip 245-246 is made by ultrasonically welding of ultra-sonically-bondable compatible materials, for example, nylon or polypropylene hooks 67 to a strip 246 of nylon or polypropylene, respectively. This intermediate hook-and-strip product 250 can be mounted immediately upon a substrate 244, or it can be stored for later use. This hook-and-strip product 250 can also be distributed to users for mounting upon their desired substrates.

Figure 19A:
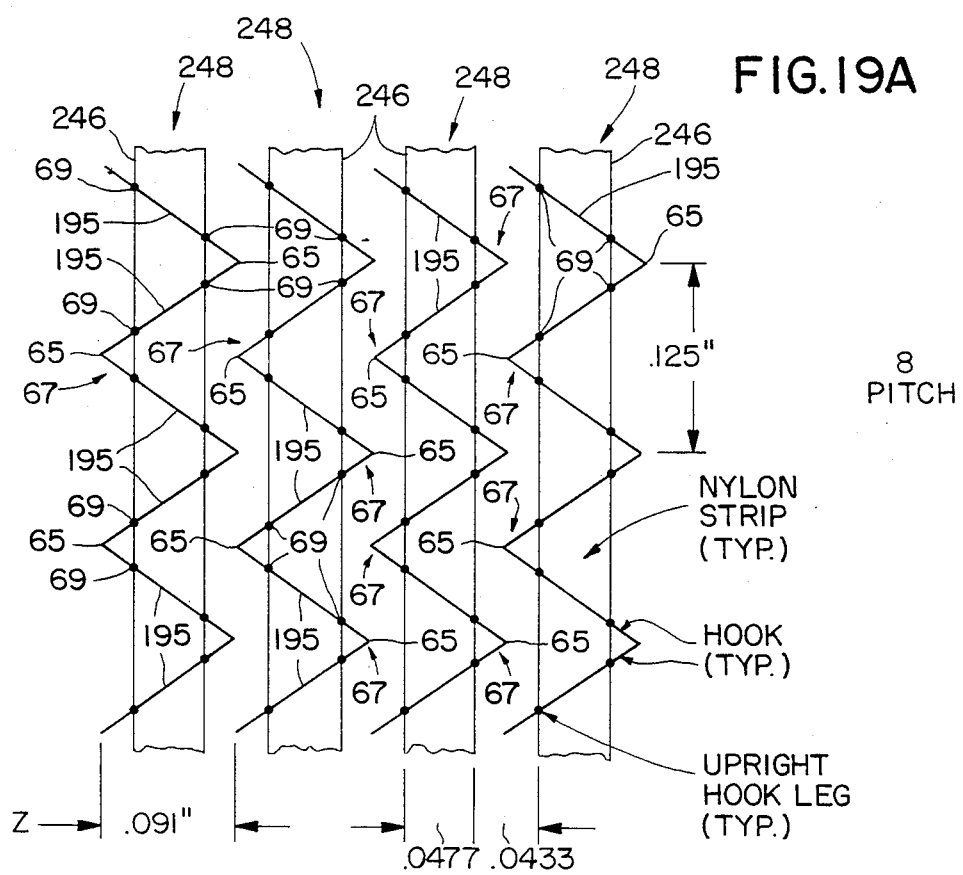
FIGS. 19A through 19H are enlarged plan view diagrams showing various pitches of the formed hooks in the hook field of the hook medium.
Figure 19B:
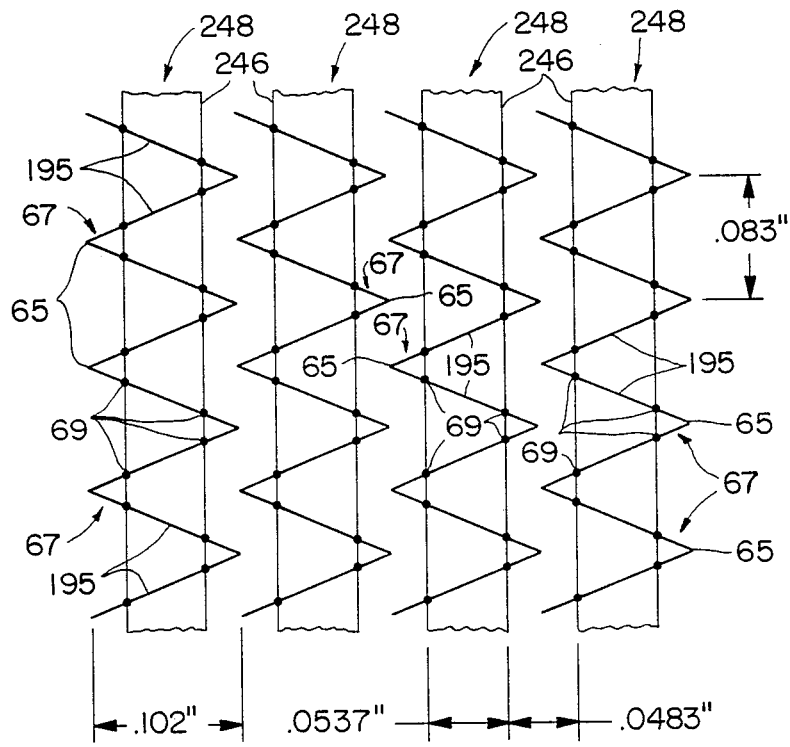
Figure 19C:
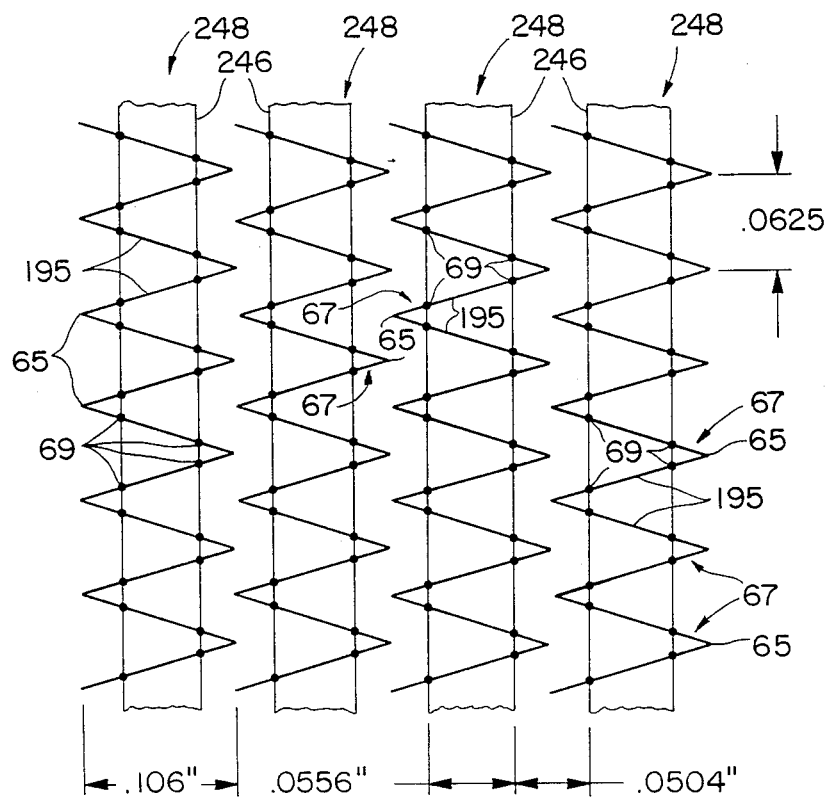
Figure 19D:
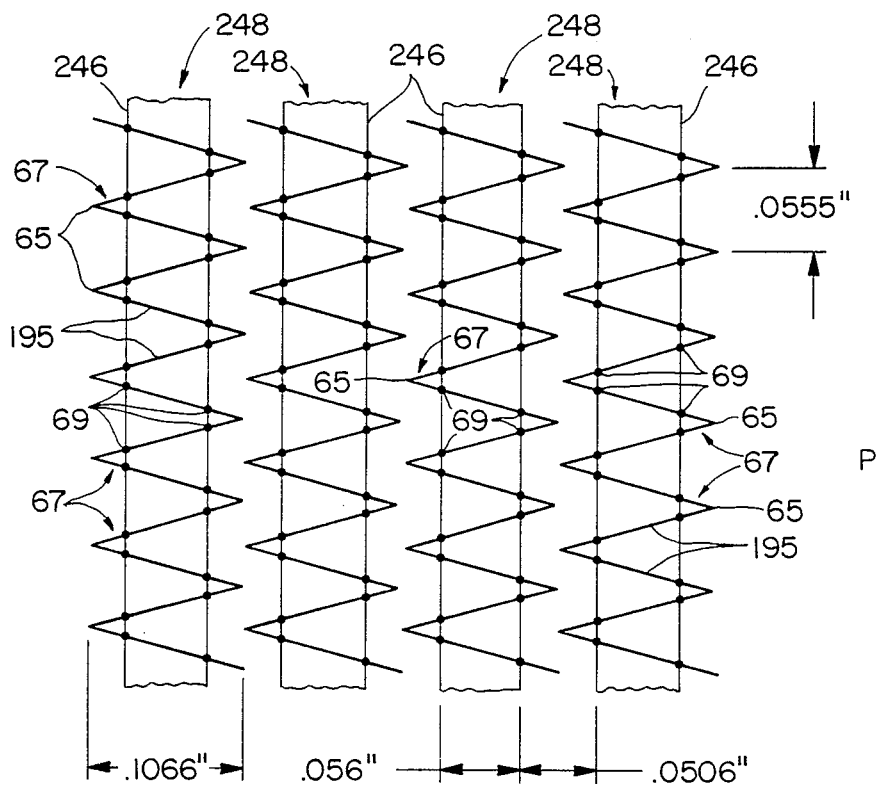
Figure 19E:
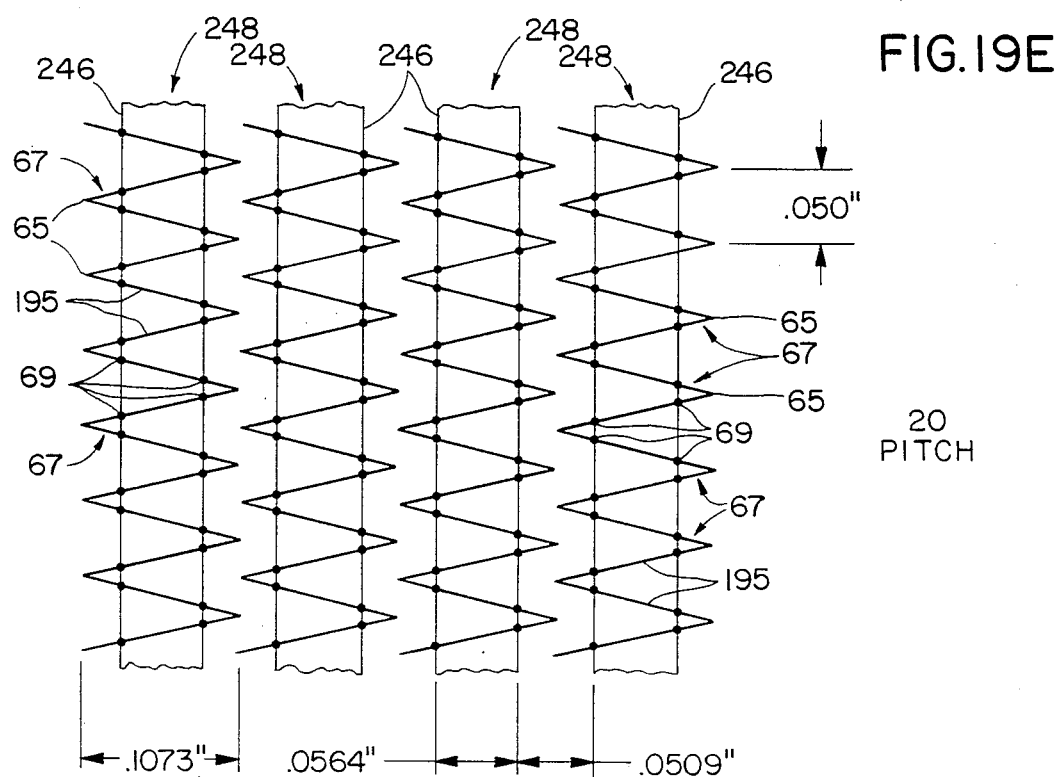
Figure 19F:
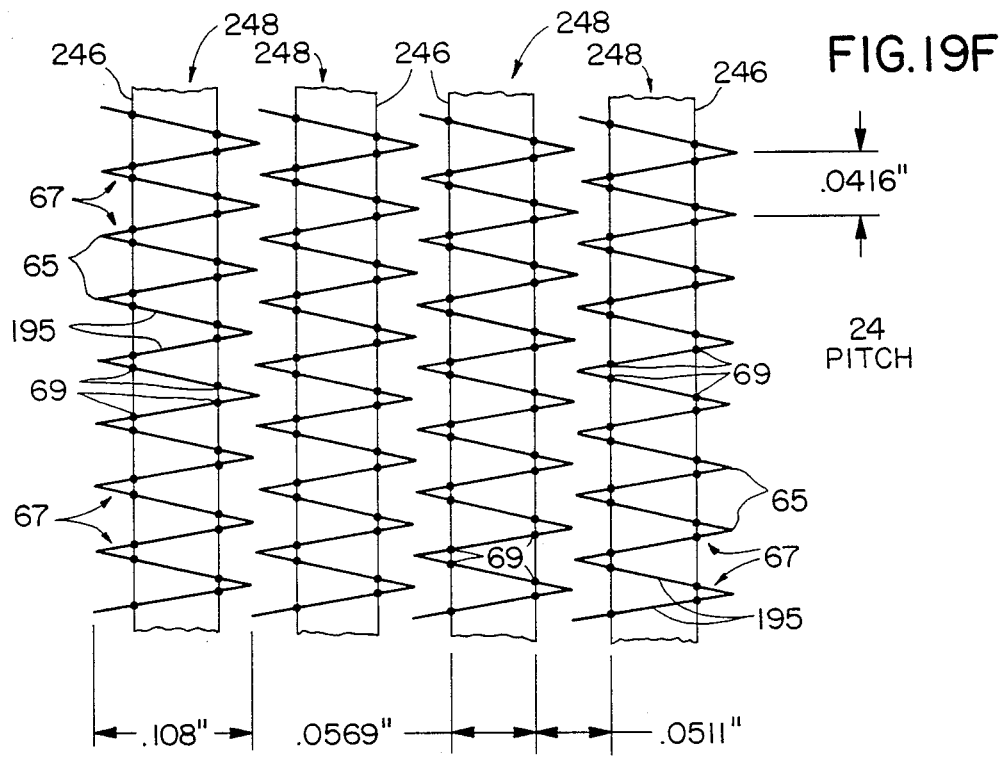
Figure 19G:
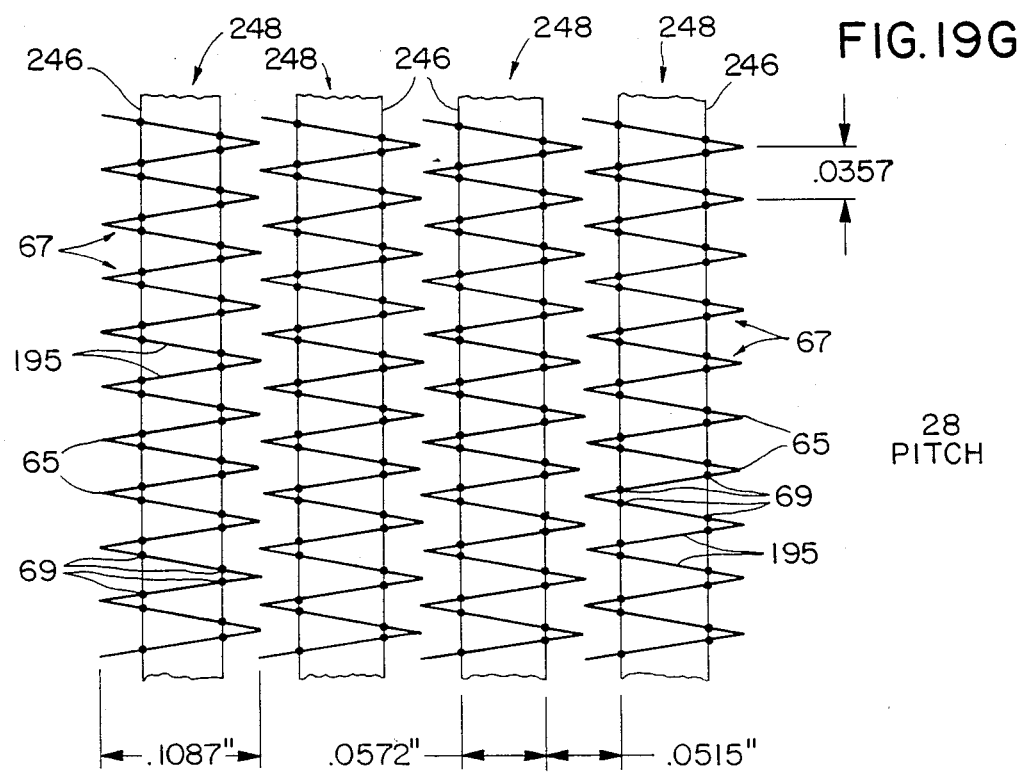
Figure 19H:
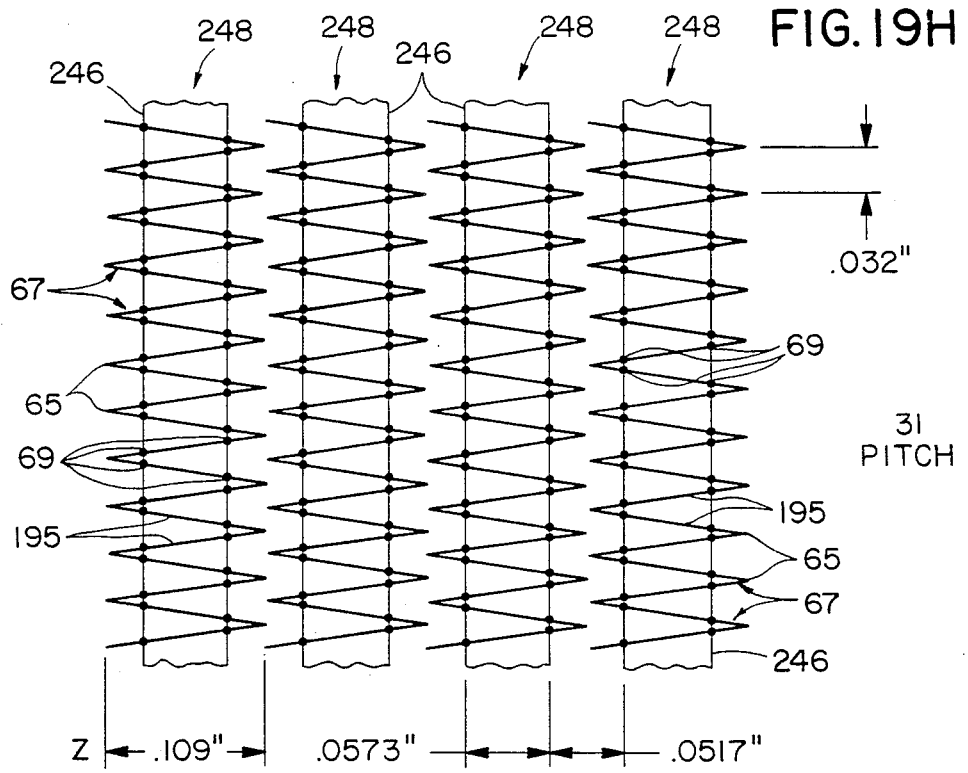

As shown in FIGS. 19A through 19H, the hooks 67 can be bonded to the substrate 244 in any desired pitch-setting over a wide range. For example, FIG. 19A illustrates an 8 pitch-setting, meaning, for example, that there are eight hooks 67 per lineal inch along each double row 248 of these hooks. FIGS. 19B, C, D, E, F, G and H illustrate 12, 16, 18, 20, 24, 28 and 31 pitch-settings, respectively.

With reference to FIG. 18, the legs of the hooks are shown at 69 and their arched hook heads at "H". The tips 65 of the hooks comprise the sharply doubled-back bends 126 (FIG. 12E) including the bent and set material of the hinge 135 formed by the scoop-nicks 66 shown in FIGS. 2 through 6.

The adjacent double hook rows 248 at the desired pitch can be bonded to the substrate 244 sufficiently closely together that the respective outwardly facing hooks of these adjacent hook rows appear to be touching tip-to-tip, as seen in the enlarged elevational view of FIG. 18, or they may be bonded to the substrate with greater lateral spacing between the successive hook rows 248, as may be desired.

The patterns shown in FIGS. 19A-H are examples wherein the segments 137 (FIGS. 12A-E) of the nicked strand 20' all have the same length "L" from the center of one hinge 135 to the center of the next hinge. Consequently, as the pitch (longitudinal spacing from hook tip 65 to hook tip) is decreased, in these respective examples of FIG. 19A through 19H, the width "Z" of the individual hook row 248 increases. Thus, the reader sees that the lateral spacing "Z" of the tips 65 of the hooks 67 in a given hook row 248 having a 31 pitch (FIG. 19H) is considerably increased relative to the lateral spacing "Z" of the tips 65 of these hooks in FIG. 19A at 8 pitch.

It is shown in FIGS. 19B–G that there are progressive changes in these various patterns of hooks as the hook pitch is increased from the particular examples of 8 pitch to 31 pitch as discussed above.

In FIG. 18 is shown a particular placement of hook rows, as well as hook shape or silhouette, as one illustrative example. A method, system and apparatus embodying the present invention can be arranged for making a wide variety of additional hook shapes and sizes. The length "L" from hinge-to-hinge can be preselected as may be desired to include various lengths of the legs 69 and various sizes and shapes of the hook heads "H". Also, the patterns and arrangements of FIGS. 19A through 19H can be varied as desired.

BI-FUNCTIONAL FASTENER MEDIUM

Figure 22:
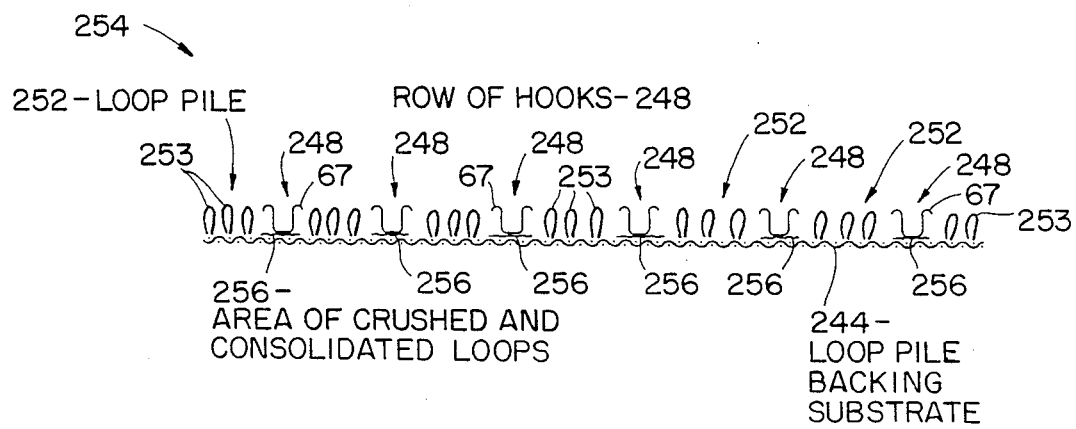
FIG. 22 shows a bi-functional fastener tape made by ultrasonically bonding rows of preformed hooks onto the loop surface of a loop fabric, for example onto the loop surface of velvet fabric having uncut loop pile.

As shown in FIG. 22, an advantageous bi-functional fastener tape 254 is formed by ultrasonically bonded pitch-set rows 248 of preformed hooks 67 (FIG. 18) directly onto the loop surface of a loop pile fabric 244, for example, onto the loop pile surface of a velvet fabric, serving as the backing substrate 244 for the bi-functional fastener tape 254. In this embodiment the velvet fabric substrate 244 has uncut loop pile 252. The ultrasonic bonding action compacts the loops 253 of the loop pile 252 in the immediate areas where the respective mounting portions 195 (see also FIG. 18) of the preformed hook rows 248 have been bonded to the loop pile surface. The compacted loops 253 become fused by the ultrasonic bonding action so as to form a strong mat-like layer 256. These mat-like layers 256 of fused loops act somewhat like and serve the same bonding or anchoring function as the bonding strips 246 shown in FIG. 18 and in FIGS. 19A–19H. Consequently, the rows of hooks 248 become strongly bonded to the compacted fused loops 253 of the fabric 244 for providing a relatively strong bi-functional fastener tape.

This bi-functional fastener medium 254 thus contains both loops 253 and hooks 67. Thus, a user has the freedom of choice of various combinations of opposable matable fastener media, because this bi-functional medium 254 can be mated with an opposed portion of the same type of bi-functional medium or can be mated with an opposed loop medium or with an opposed hook medium.

FURTHER EMBODIMENTS

Figure 13A:
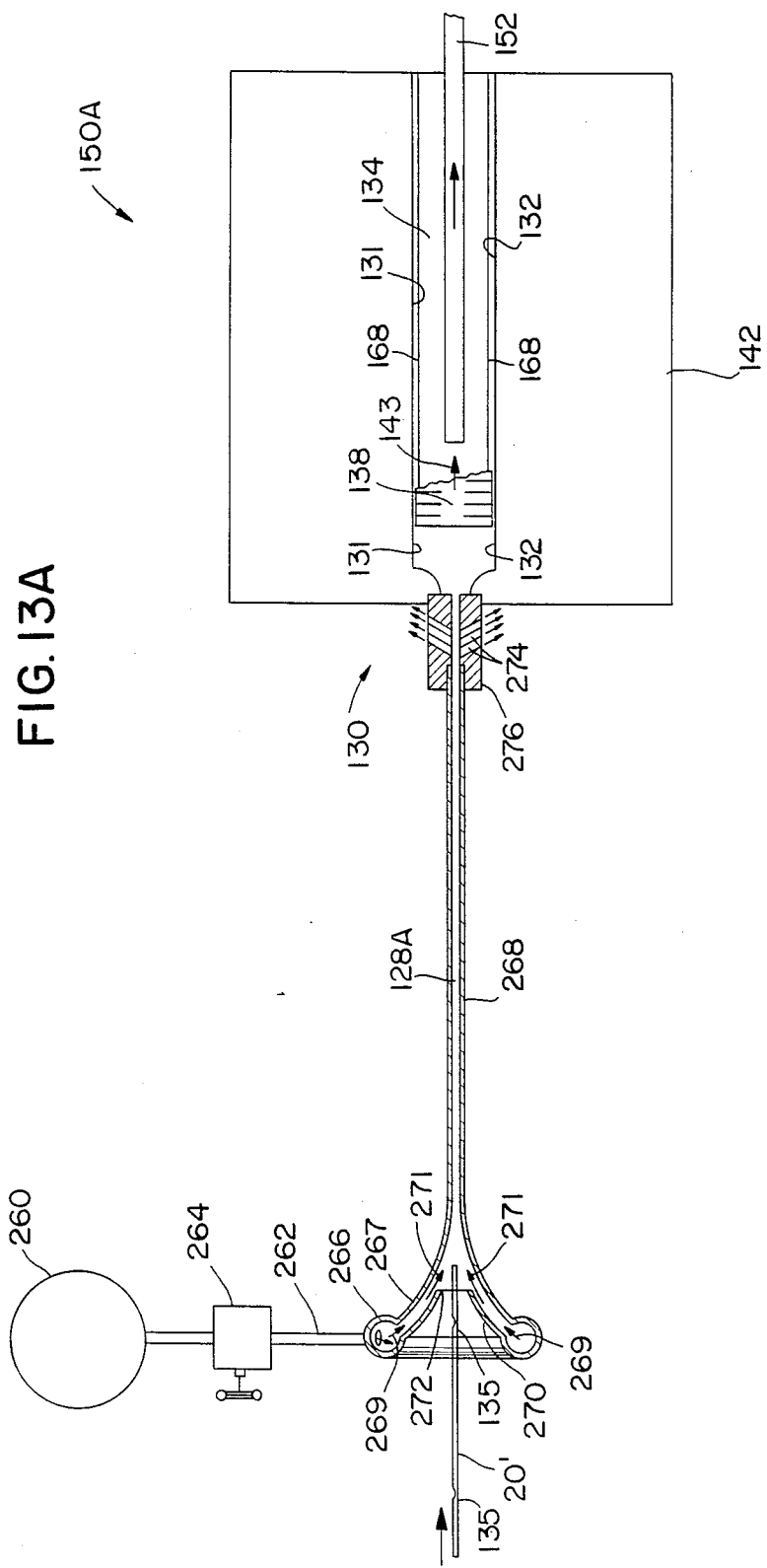
FIG. 13A shows a further embodiment of the zigzag station wherein the nicked strand is driven forward by flowing air.

In FIG. 13A is shown an alternative embodiment of a zigzag system and apparatus 150A, in which compressed air is used to drive the scoop nicked strand 20' along a passageway 128A into the zigzag station 130. A source of dry compressed air 260, for example, the receiver tank of a "shop air" compressor, is charged to a pressure in the range of about 80 to about 120 p.s.i. The pressurized air in this tank 260 has been supplied from a compressor after being treated by an air/oil separator, a moisture eliminator, and a fine particulate filter, so that the pressurized air is dry and clean. From this source 260, the pressurized air is fed by a supply line 262 through a manually adjustable pressure regulator 264. The pressure-regulated air enters a toroidal chamber 266 (shown in axial section), which then feeds the air into a guide passageway 128A formed by a tube 268 (shown in axial section). A trumpet entrance 267 couples the toroidal chamber 266 to the tube 268. A short segment of a nicked strand 20' is shown approaching the entrance 267 for clarity of illustration.

In order to propel the nicked strand 20' along the passageway 128A, the toroidal chamber 266 has an outlet shown by the flow arrows 269. This outlet 269 encircles the entering strand 20' and is positioned adjacent to the inner surface of the trumpet-shaped entrance 267. An air flow director 270 aims pressurized air at high velocity into the passageway 128A, as indicated by the flow arrows 271. The flow director 270 has a shape similar to the convex inner surface of the trumpet-shaped entrance 267 and converges in the downstream direction with this inner surface. The flow director 270 terminates at a downstream lip 272 which is close to the convex inner surface of the entrance horn 267 for producing a high velocity flow 271 directed tangentially along this convex inner surface. This convex inner surface of the entrance horn 267 merges smoothly into the passageway 128A, and by virtue of aiming the high velocity flow 271 tangentially therealong, this fast flow tends to cling to and to follow the entrance surface into passageway 128A for driving the strand 20' forward along the passageway.

The downstream end of the tube 268 fits into a socket in an air outlet ferrule 276 fitting into a recess in the block 142 immediately adjacent to the zigzag station 130. This air outlet ferrule has numerous small outlet ports 274 for discharging the air from passageway 128A just prior to entry of the strand 20' into the zigzag station. The strand 20' is thus formed into a zigzag configuration 140 as previously described and is then shaped into hooks 67.

Figure 20:
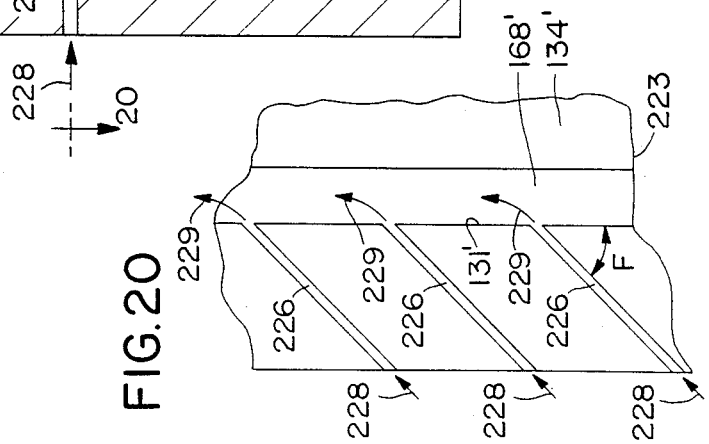
FIG. 20 (located adjacent to FIG. 17A) is a partial plan sectional view taken along the line 20—20 in FIG. 17A showing cooling air passages.

In FIGS. 25, 26 and 27A through 27I is shown an alternative embodiment of a hook forming method, system and apparatus 180A. In the zigzag station 130 (FIG. 25) a nicked strand (not shown) is shaped into a zigzag strand configuration 140 (FIG. 12E) as described previously. The nicked strand is propelled into the zigzag station 130 by either the apparatus shown in FIGS. 13 and 14 or the apparatus as shown in FIG. 13A. The zigzagged strand 140 is fed downstream from the zigzag station by retainer feed belts 152, 154 similar to those shown in FIGS. 15 and 17A and by the heated and cooled air flows. The sharply doubled-back bends 126 are heat softened by heated air 174 and its flow 175 as previously described and shown in FIGS. 15A and 15B. These heat-softened bends are then set by cooled air 228 and its flow 229 as previously described and as shown in FIGS. 17A and 20.

The upstream end of a support track 181A (FIG. 25) is similar to the upstream end of a support track 181 (FIG. 14) as is shown by the cross-sectional view in FIG. 17A. The downstream end of this support track 181A includes clearance openings 162' and 164' in lower and upper track members 223A and 224A, respectively, for accommodating grooved pulley wheels 156' and 158'. These pulley wheels 156', 158' are similar to the pulley wheels 156, 158 shown in FIG. 15 and serve as idlers for directing the retainer feed belts 152, 154 back toward the drive pulley wheels 156, 158.

Extending from the downstream end of the track members 223A and 224A (FIG. 25) are lower and upper hook-shaping track members 277 and 278 in a hook-shaping zone 184 and defining a hook-shaping passageway 290 (FIG. 26) between them. As shown in cross section in FIG. 26, the lower shaping member 277 includes a pair of spaced, parallel, upstanding, longitudinally extending ridges 197 defining a longitudinally extending recess 193 between them. Each of these ridges 197 has a smoothly rounded top and vertical parallel side surfaces, thereby each having the shape of a rounded-edge upstanding blade.

The upper shaping member 278 includes a downwardly projecting flat-topped ridge 199 straddled by a pair of parallel longitudinal valleys 201. The ridge 199 is aligned with the recess 193 and is sized to fit into this recess with sufficient clearance relative to the recess 193 and ridges 197 for shaping the central portion of the zigzag strand configuration 140 into the mounting portions 195 (FIGS. 18 and 26I) of the twinned hooks 67. The upper shaping member 278 has a pair of spaced parallel flanges 280 straddling the lower shaping member 277 for maintaining alignment between the ridge 199 and the recess 193. This ridge 199 is provided by a strip 282 clamped between mirror-image halves of the upper shaping member 278, as indicated by the sectioning in FIG. 26.

Figure 25:
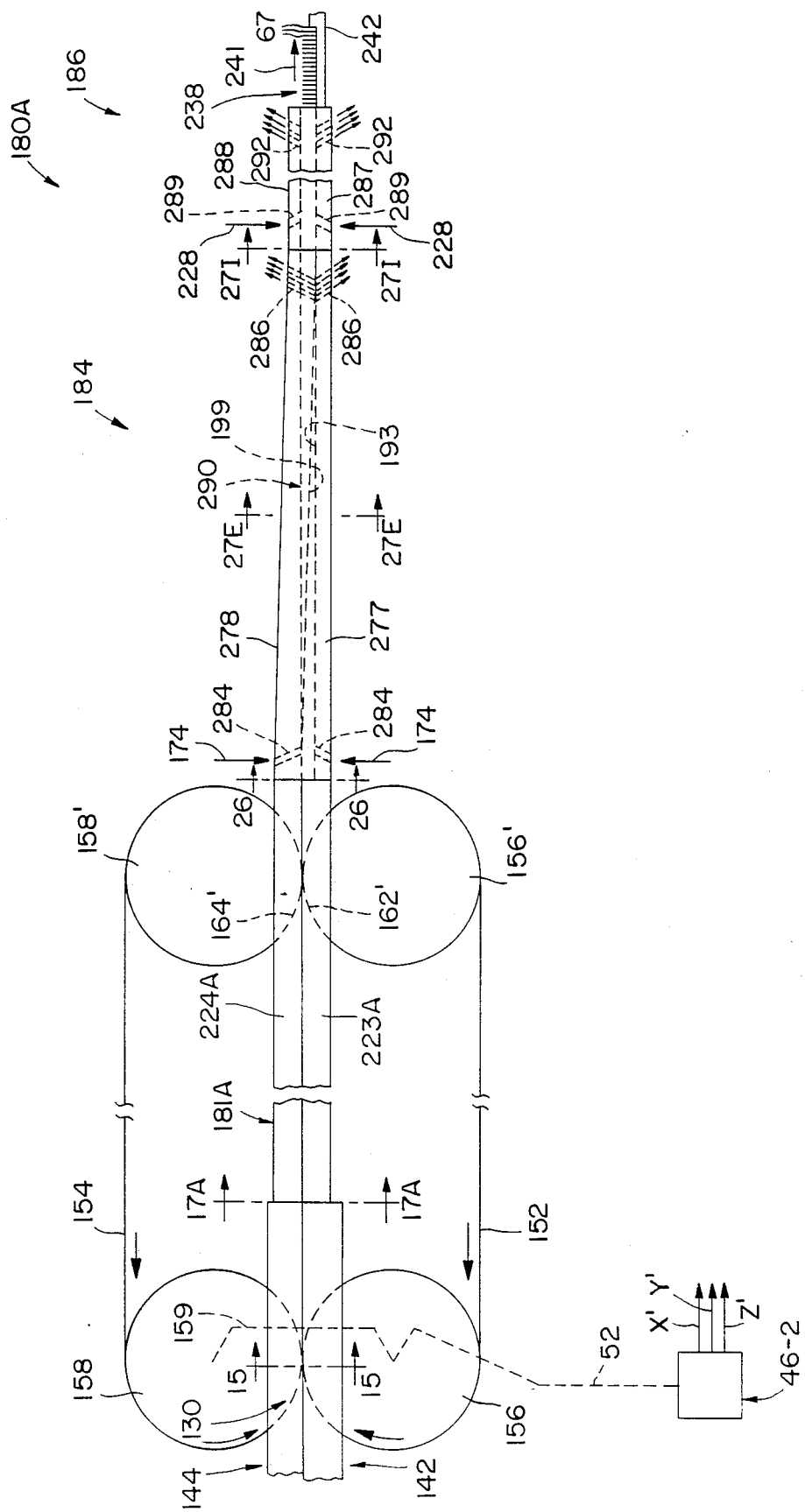
FIG. 25 is a side elevational view of an alternative embodiment of a hook forming method, system and apparatus.

For shaping the hooks 67 (FIG. 18), the shaping members 277, 278 progressively converge with each other in the downstream direction. This progressive convergence is shown in FIG. 25, with the upper member 278 sloping downwardly relative to the lower member.

Figure 26:
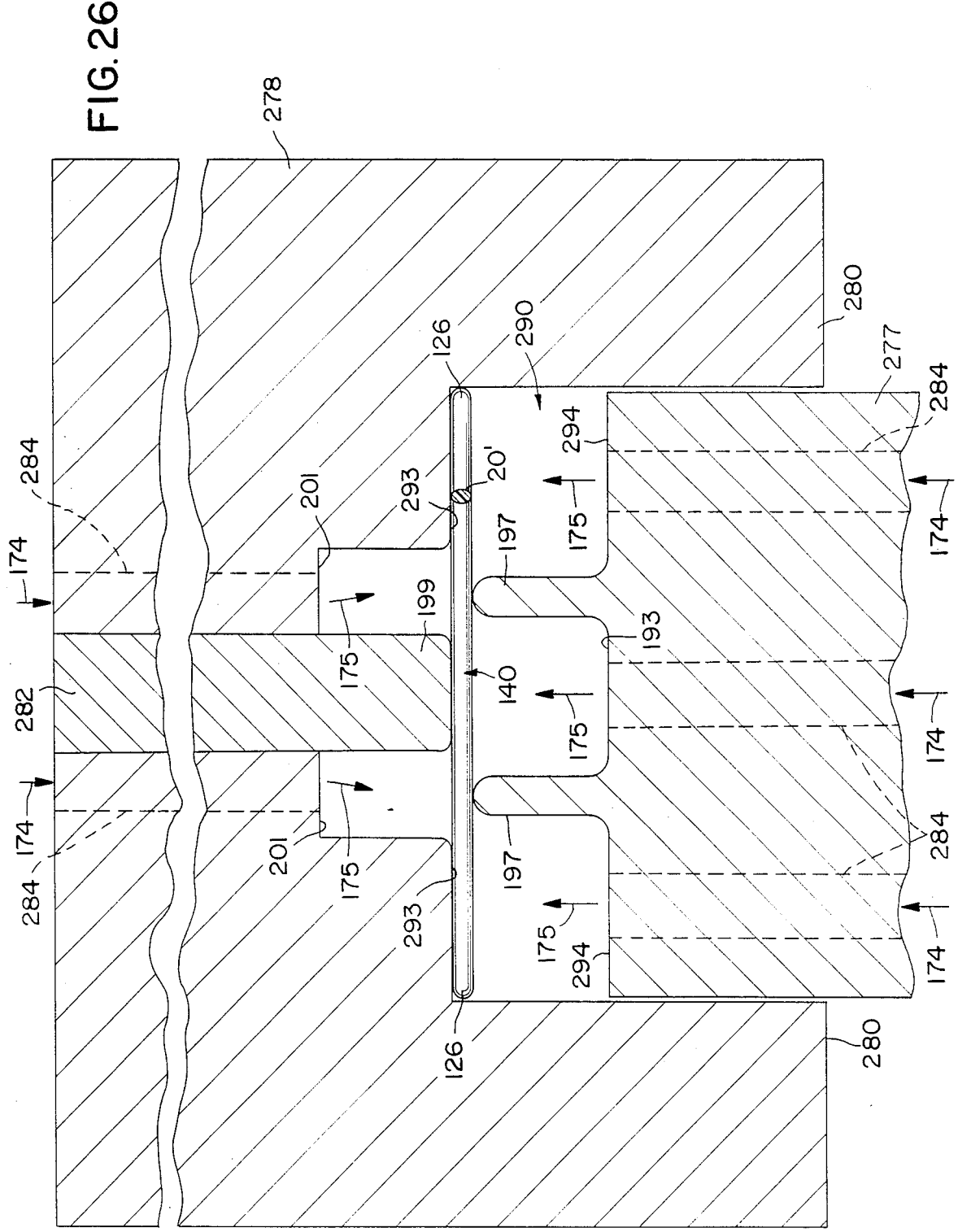
FIG. 26 is an enlarged cross-sectional view taken along the line 26—26 in FIG. 25.
Figure 27A:
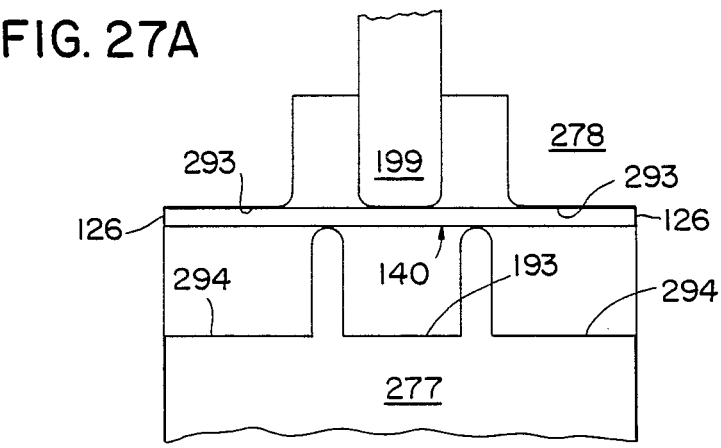
FIGS. 27A through 27I show simplified outlines corresponding with the appearances of enlarged cross-sectional views taken at uniformly spaced locations along the hook forming members 277, 278 in FIG. 25 for showing progressive stages in shaping of the hooks. For convenience of reference, the section lines 27E—27E and 27I—27I indicate respective locations corresponding to FIGS. 27E and 27I.
Figure 27B:
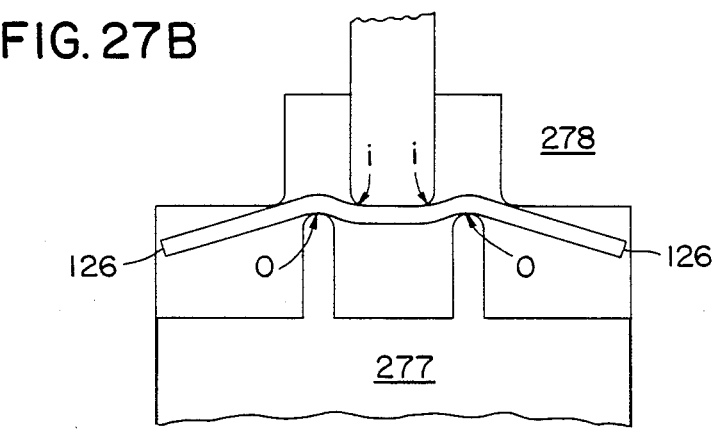
Figure 27C:
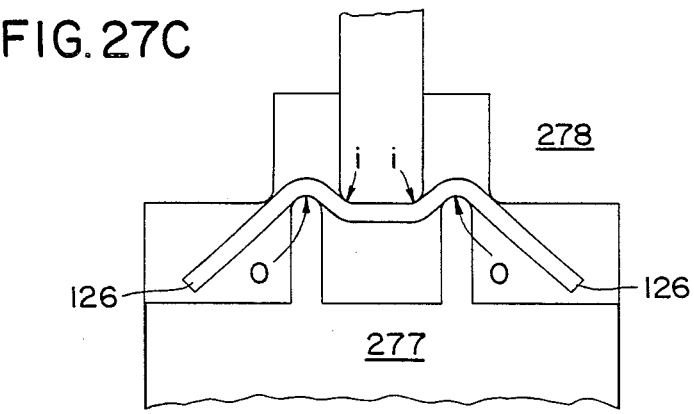
Figure 27D:
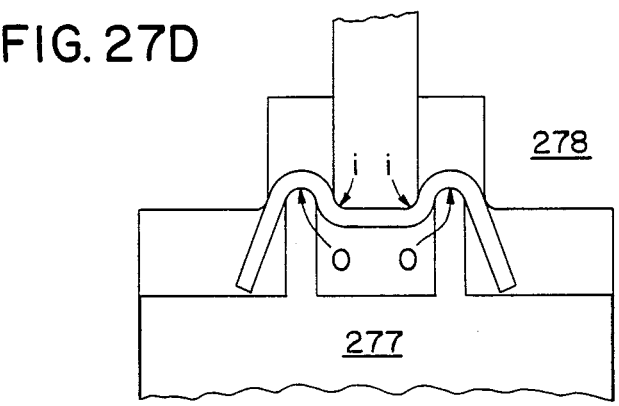
Figure 27E:
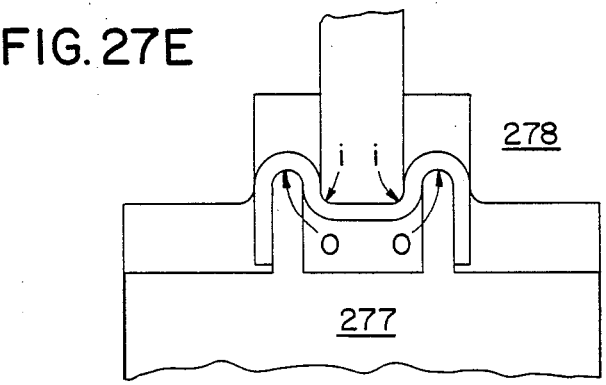
Figure 27F:
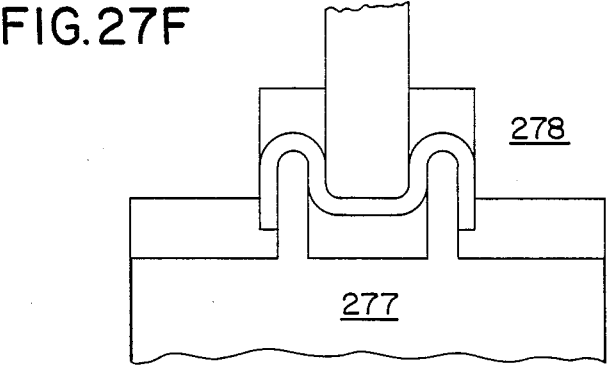
Figure 27G:
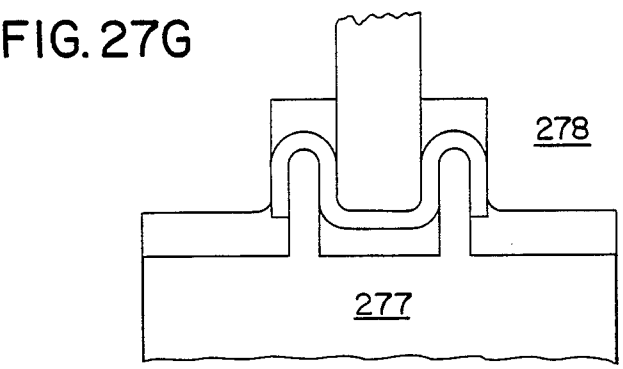
Figure 27H:
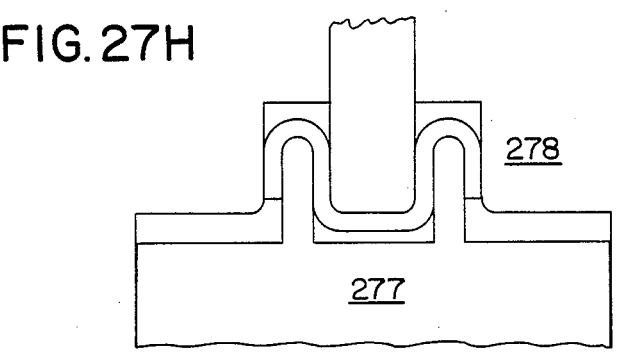
Figure 27I:
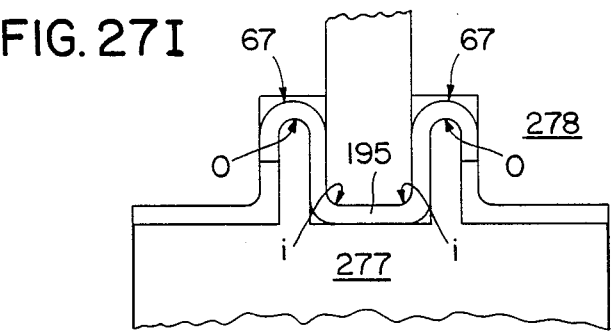

FIGS. 27A through 27I show simplified outlines for purposes of explanation. These outlines correspond with the appearances of cross-sectional views taken at uniformly spaced positions along the length of the shaping members 277, 278 in FIG. 25. Thus, FIG. 27A corresponds with the cross section of FIG. 26 taken at the upstream end of the shaping members 277, 278. FIG. 27I corresponds with a cross section taken at the downstream end of these shaping members, as indicated at 27I—27I in FIG. 25. FIG. 27E corresponds with a cross section taken half way along these shaping members, as shown at 27E—27E in FIG. 25. For clarity of illustration, the locations of the other outline section views of FIGS. 27 are not indicated in FIG. 25, it being understood that they are uniformly spaced along the shaping members 277, 278.

As these shaping members converge, the passageway 290 reduces in vertical spacing, and the zigzag strand configuration 140 of FIGS. 26 and 27A is progressively deformed and shaped into the twinned hooks 67 of FIGS. 18 and 27I. For permanently setting the shape of these hooks, the material of the strand 20' (FIG. 26) is heat softened by heated air 174 supplied through inlets 284 (FIG. 25) located near the upstream end of the passageway 290 for providing heated air flow 175 within this hook-shaping passageway. This heated air flow 175 is discharged from the passageway 290 by outlets 286 near the downstream end of the hook-shaping members 277, 278, as shown by the multiple small arrows.

In order to set the heat-softened material, the row of hooks 238 are passed between lower and upper hook-setting members 287, 288 defining a hook-setting zone 186. These members 287, 288 define a passageway between them with a cross-sectional outline corresponding to the desired final hook shape, and they have inlets 289 near their upstream end for admitting cooled dry air 228. There are air flow discharge outlets 292 near the downstream end of the hook-setting members 287, 288. The row 238 of hooks 67 issuing, as shown by arrow 241, from the downstream end of the setting members 287, 288 is carried by a channel guide or chute 242. This row of hooks 238 is then spread into the desired pitch, as previously described, and is then bonded to a desired strip or substrate, as is shown in FIGS. 18, 19, 22 or 24.

The upper shaping member 278 includes a pair of shoulders 293 (FIGS. 26, 27A) at the same level as the flat bottom of the central ridge 199. In the lower shaping member 277, the bottom surface of the central recess 193 between the rounded top fin-like ridges 197 is at the same level as the two upward-facing level surfaces 294 which are opposed to the shoulders 293.

The zigzagged strand 140 (FIGS. 12E, 26 and 27A), wherein the successive straight segments 137 are closely spaced side-by-side in substantially parallel relationship, has the overall configuration of a ribbon, which initially is flat as seen in FIGS. 26, 27A). The sharply doubled-back bends 126 are located at the edges of the margins of this ribbon. FIGS. 27B–27I show progressive shaping of this ribbon along four longitudinally extending bends comprising a pair of inner bends "i" and a pair of outer bends "o" which straddle these inner bends. The inner bends "i" are laterally spaced, being mirror images of each other, and they progressively depress a median portion of the ribbon into a channel shape having a flat bottom of significant width. When this channel shape is completely formed, as seen in FIG. 27I, the inner bends "i" have become about 90° each; and those portions of the strand located in the bottom of this channel shape comprise the mounting portions 195 for the hooks 67. It is noted in FIGS. 27B and 27C that the outer bends "o" initially are located relatively far inward in the respective margins of the ribbon. Thus, these outer bends "o" initially are spaced relatively far from the edges of the ribbon where the sharply doubled-back bends 126 are located. As the median channel shape becomes progressively deepened by the inner bends "i", progressively moving downwardly relative to the outer bends "o", the respective margins of the ribbon are pulled inwardly and downwardly. Thus, the ribbon margins migrate inwardly relative to the outer bends "o". Consequently, these outer bends, which have an inverted U-shape, are moved progressively closer to the edges of the margins to become the heads "H" (please see also FIG. 18) of the hooks 67, with the sharply doubled-back bends 126 forming the hook tips 65.

Inviting attention again to FIG. 24, it is to be understood that the intermediate hook-and-strip product 250 may comprise multiple rows of twinned hooks 67 bonded to a wider flexible strip 246 having perforations or porosity 245. FIG. 24 shows only a single row of twinned hooks 67 bonded to a narrow strip 246 as one example for clarity of illustration of this intermediate product 250.

It is to be understood that terms oriented relative to the Earth's horizon, for example, such as "upper", "lower", "upward", "upwardly", "downward", "downwardly", "top", "bottom", and the like, are used for convenience of reference to the drawings, as shown, and are not intended as limitations of the invention. The methods, systems and apparatus of the various embodiments of the invention advantageously can be positioned and operated at any desired orientation relative to the Earth's gravitational field, with one exception: if the thrust "T" (FIG. 1) on the dancer pulley 29 is provided by a weight, then such a weight is arranged, for example, as being strung on a flexible line passing over any convenient pulley, so that gravitational attraction of this weight toward the Earth applies a thrust "T" in the desired direction to the dancer pulley.

While the invention has been particularly shown and described with reference to preferred embodiments, it will be understood by those skilled in the art that various changes in form, details and dimensions may be made without departing from the spirit and scope of the invention, as defined by the appended claims and equivalents of the claimed elements.

We claim:

1. The method of forming a strand of bendable, settable material into a zigzag configured strand having sharply doubled-back bends comprising the steps of:
    feeding the strand endwise along a first path,
    nicking the strand as it travels along said first path for creating nicked regions spaced by predetermined distances along the length of the strand,
    feeding the nicked strand in forward motion endwise along a second path, said second path communicating with a zigzag station for directing the nicked strand into the zigzag station, and
    in said zigzag station slowing the forward motion of the nicked strand for causing the nicked strand to bend at the nicked regions into a zigzag configured strand having sharply doubled-back bends.

2. The method of claim 1, wherein:
    said sharply doubled-back bends cause successive segments of the nicked strand between successive doubled-back bends to become relatively closely spaced side-by-side giving said zigzag configured strand an overall configuration of a flat ribbon.

3. The method of claim 2, wherein:
said nicks are scoop-nicks,
said scoop-nicks have depth and length at the nicked regions for leaving a reduced cross-sectional area "A" of material of sufficient length for providing bendable hinges permitting sharply doubled-back bends for enabling the successive segments to become relatively closely spaced side-by-side in substantially parallel relationship, and
said reduced cross-sectional area "A" contains sufficient material in the hinges for maintaining interconnection of successive segments of the strand in said flat ribbon configuration.

4. The method of claim 3, wherein:
the strand has an initial cross-sectional area,
said reduced cross-sectional area "A" is in the range of about 60% to about 30% of the initial cross-sectional area of the strand.

5. The method of claim 3, wherein:
the strand has a diameter "D",
said scoop-nicks extend along the length of the strand for more than about 2.3D for providing desired flexibility of the resulting hinges.

6. The method of claim 3, wherein:
the strand has an initial cross-sectional area with a diameter "D",
said reduced cross-sectional area "A" is in the range of about 60% to about 30% of the initial cross-sectional area of the strand, and
said scoop-nicks extend along the length of the strand for more than about 2.3D for providing desired flexibility and strength of the resulting hinges.

7. The method of, claim 3, wherein:
a plurality of scoop-nicks are located at each nicked region along the length of the strand for defining the hinge at each nicked region.

8. The method of claim 3, wherein:
one scoop-nick is located at each nicked region along the length of the strand for defining the hinge at each nicked region.

9. The method of claim 3, wherein:
said scoop-nicks are produced in the stand by at least one laser beam impinging on the strand while said strand is moving endwise along a curvilinear portion of said first path around a rotating member.

10. The method of claim 3, wherein:
said scoop-nicks are produced in the strand by at least one laser beam impinging on the strand while said strand is moving endwise along a straight portion of said first path.

11. The method of claim 2, including the further step of:
progressively shaping said zigzag configured strand of overall flat ribbon configuration into a row of twinned hooks.

12. The method of claim 11, including the further steps of:
heating the material of said zigzag configured strand by at least one flow of heated air for softening the material during said progressive shaping, and
cooling said material following said progressive shaping for setting said row of twinned hooks.

13. The method of claim 2, including the further steps of:
heating said sharply doubled-back bends by flows of heated air for softening material of the strand near said sharply doubled-back bends, and
thereafter cooling said sharply doubled-back bends by flows of air at least as cold as room temperature for setting said sharply doubled-back bends.

14. The method of claim 13, including the further step of:
drying said flows of heated air before said flows come in contact with the sharply doubled-back bends for enabling said flows of heated air to carry away any moisture released upon heating of the material of the strand.

15. The method of claim 2, including the further steps of:
moving said ribbon configuration of the zigzag configured strand endwise through a hook-shaping zone wherein said ribbon configuration is progressively shaped into a row of hooks having mounting portions of the strand associated with the hooks.

16. The method of claim 2, including the further steps of:
moving said flat ribbon configuration of the zigzag configured strand endwise into a hook-shaping zone,
in said hook-shaping zone progressively bending said ribbon along four longitudinally extending bends comprising a pair of inner bends and a pair of outer bends,
said pair of inner bends being laterally spaced and being mirror images of each other for shaping a median portion of said ribbon into a channel shape having a bottom of significant width wherein portions of the strand comprise hook mounting portions, and
said pair of outer bends straddling said pair of inner bends and said pair of outer bends being concave downward for shaping the respective margins of said ribbon into heads of hooks.

17. The method of claim 16, wherein:
said pair of outer bends are parallel with each other, and
said channel shape becomes progressively deeper between said outer bends causing the respective margins of the ribbon to migrate relative to said outer bends for moving said outer bends closer to the edges of the margins wherein said sharply doubled-back bends of the zigzagged strand are located for positioning said heads of hooks relatively near said sharply doubled-back bends, said sharply doubled-back bends comprising tips of hooks.

18. The method of claim 2, including the further steps of:
moving said ribbon endwise into and through a hook-shaping zone, as the ribbon is moving endwise through said zone progressively bending said ribbon along four longitudinally extending bends comprising a pair of inner bends and a pair of outer bends,
said pair of inner bends being laterally spaced and being mirror images of each other,
said inner bends being progressively bent each into about a 90° bend for shaping a median portion of said ribbon into a channel shape having bottom of significant width wherein portions of the strand comprise hook mounting portions, and
said pair of outer bends straddling said pair of inner bends and said pair of outer bends being concave downward for shaping portions of respective margins of said ribbon into inverted U-shape portions wherein said inverted U-shape portions of the strand comprise heads of hooks.

19. The method of claim 18, wherein:
said pair of outer bends extend parallel with each other longitudinally of the ribbon, and
said channel shape becomes progressively deeper between said outer bends as said inner bends are progressively bent each into about a 90° bend causing the respective margins of the ribbon to be pulled inwardly relative to said outer bends for locating said outer bends closer to the edges of the margins.

20. The method of claim 18, including the further step of:
providing in said hook-shaping zone stationary surfaces converging in the direction of the endwise moving of said ribbon for causing said progressive bending of said ribbon.

21. The method of claim 1, comprising the further step of:
providing air flow moving along said second path in the direction of said forward motion,
said air flow being faster than said forward motion for propelling the nicked strand.

22. The method of claim 21, comprising the further step of:
pulsing said air flow.

23. The method of forming a strand of bendable, settable material into a zigzag configured strand having sharply doubled-back bends comprising the steps of:
feeding the strand endwise along a first path,
nicking the strand as it travels along said first path for creating nicked regions spaced by predetermined distances along the length of the strand,
feeding the nicked strand in forward motion endwise along a second path, said second path communicating with a zigzag station for directing the nicked strand into and through the zigzag station,
in said second path and in said zigzag station, guiding said nicked strand by upper and lower surfaces positioned above and below said strand for preventing said nicked strand from significantly bending upwardly and downwardly,
in said second path, providing first and second side guide surfaces positioned with relatively close lateral spacing on opposite sides of said strand for preventing said nicked strand from significantly bending laterally in either direction,
in said zigzag station, arranging said first and second guide surfaces with relatively increased lateral spacing for permitting lateral bending of said nicked strand in either direction, and
in said zigzag station, slowing the forward motion of the nicked strand for causing the nicked strand to bend laterally in opposite directions at successive nicked regions for forming the nicked strand into a zigzag configured strand having sharply doubled-back bends.

24. The method of claim 23, wherein:
said sharply doubled-back bends cause successive segments of the nicked strand between successive doubled-back bends to become relatively closely spaced side-by-side giving said zigzag configured strand an overall configuration of a flat ribbon.

25. The method of claim 24, wherein:
said nicked regions are spaced uniformly along the strand by distances "L", whereby said flat ribbon has a width comparable with "L", and including the step of:
arranging said first and second side guide surfaces for defining an outlet passageway from said zigzag station with said first and second side guide surfaces being spaced apart laterally by a distance comparable with "L" for guiding said flat ribbon out of said zigzag station.

26. The method of claim 25, comprising the further steps of:
moving said ribbon configured zigzagged strand endwise into and through a hook-shaping zone,
in said hook-shaping zone, progressively bending said ribbon along four longitudinally extending bends comprising a pair of inner bends and a pair of outer bends,
said pair of inner bends being laterally spaced and being mirror images of each other,
said inner bends being progressively bent each into about a 90° bend for shaping a median portion of said ribbon into a channel shape having a bottom of significant width wherein portions of the strand comprise hook mounting portions, and
said pair of outer bends straddling said pair of inner bends and said pair of outer bends being concave downward for shaping the respective margins of said ribbon into heads of hooks.

27. The method of claim 26, wherein:
said pair of outer bends extend parallel with each other longitudinally of the ribbon, and
said channel shape becomes progressively deeper between said outer bends as said inner bends are progressively bent each into about a 90° bend causing the respective margins of the ribbon to move relative to said outer bends shifting said outer bends closer to the edges of the margins where said sharply doubled-back bends of the zigzag configured strand are located, said sharply doubled-back bends comprising tips of hooks.

28. The method of claim 26, including the further step of:
defining said hook-shaping zone by stationary surfaces extending longitudinally of the ribbon and converging in the direction of the endwise moving of said ribbon for producing said progressive bending of said ribbon along said four longitudinally extending bends.

29. The method of claim 23, including the further step of:
creating a flow of air travelling longitudinally along said second path in forward motion faster than the forward motion of said nicked strand for propelling the nicked strand into said zigzag station.

30. The method of forming a strand of bendable, settable material into a zigzag configured strand having sharply shaped doubled-back bends and forming said zigzag configured strand into multiple hooks comprising the steps of:
feeding the strand endwise along a first path,
scoop nicking the strand at positions spaced along its length as it is travelling along said first path producing scoop-nicks in said strand,
said scoop-nicks having depth and length for causing the remaining material of the strand adjacent to the scoop-nicks to be bendable hinges, feeding the resultant scoop-nicked strand endwise in a downstream direction along a second path at a first predetermined downstream rate, guiding the scoop-nicked strand moving along said second path for providing easy endwise movement while preventing significant bending of said hinges, directing said second path into a zigzag station wherein the scoop-nicked strand moves downstream, in the zigzag station, guiding the scoop-nicked strand above and below for preventing significant upward or downward bending of said hinges, in the zigzag station, arranging side guide surfaces spaced laterally for permitting successive hinges to bend laterally in opposite directions in zigzag manner, in the zigzag station, slowing downstream motion of the scoop-nicked strand to a second predetermined rate for causing successive hinges to bend in opposite directions in sharply doubled-back bends with successive segments of the scoop-nicked strand between successive bends assuming side-by-side relationship in a ribbon with said sharply doubled-back bends being at opposite edges of said ribbon, moving said ribbon endwise through a hook-shaping zone, in said hook-shaping zone, progressively bending said ribbon along four longitudinally extending bends comprising a pair of inner bends and a pair of outer bends, said pair of inner bends being laterally spaced and being mirror images of each other for shaping a median portion of said ribbon into a channel shape having a bottom of significant width wherein portions of the strand comprise hook mounting portions, and said pair of outer bends straddling said pair of inner bends and being concave downward for shaping the respective margins of said ribbon into heads of hooks, with said sharply doubled-back bends being tips of hooks.

31. The method of claim 30, comprising the further steps of:

heating the material of said ribbon by at least one flow of heated air for softening the material during said progressive bending, and cooling said material following said progressive bending for setting said inner and outer bends.

32. The method of claim 30, comprising the further steps of:

heating said sharply doubled-back bends by flows of heated air for softening material of the strand near said sharply doubled-back bends at opposite edges of said ribbon, and thereafter cooling said sharply doubled-back bends by flows of cooling air for setting said sharply doubled-back bends.

33. The method of claim 32, comprising the further step of:

drying said flows of heated air before said flows come in contact with the sharply doubled-back bends for enabling said flows of heated air to carry away any moisture released upon heating of the material of the strand.

34. The method of claim 32, comprising the further steps of:

directing said flow of heated air in the direction of moving of said ribbon, and directing said flow of cooling air in the direction of moving of said ribbon.

35. The method of claim 34, further comprising:

pulsing at least one of said flows for urging the moving of said ribbon.

36. The method of claim 30, in which:

said strand has a diameter "D", said scoop-nicks are spaced along the length of the strand by distances "L", and the ratio of said second predetermined rate to said first predetermined rate is about equal to D/L for positioning successive segments of the scoop-nicked strand in closely adjacent side-by-side relationship in the zigzag station.

37. The method of claim 30, comprising the further step of:

bonding said hook mounting portions of the strand to a flexible, porous strip for providing a hook-and-strip product adapted for attachment by adhesive to a substrate.

38. The method of claim 30, comprising the further step of:

ultrasonically bonding said hook mounting portions of the strand to a flexible, porous strip of material similar to the material of the strand for facilitating ultrasonic bonding of said hook mounting portions thereto for providing a hook-and-strip product adapted for attachment by adhesive to a substrate of material dissimilar from the material of the strand.

* * * * *